(12) United States Patent
Fairclough

(10) Patent No.: US 7,710,418 B2
(45) Date of Patent: May 4, 2010

(54) SYSTEMS AND METHODS FOR THE REAL-TIME AND REALISTIC SIMULATION OF NATURAL ATMOSPHERIC LIGHTING PHENOMENON

(75) Inventor: Matthew P. Fairclough, Ellesmere Port (GB)

(73) Assignee: Linden Acquisition Corporation, San Francisco, CA (US)

( * ) Notice: Subject to any disclaimer, the term of this patent is extended or adjusted under 35 U.S.C. 154(b) by 430 days.

(21) Appl. No.: 11/051,318

(22) Filed: Feb. 4, 2005

(65) Prior Publication Data

US 2006/0176303 A1 Aug. 10, 2006

(51) Int. Cl.
- *G06G 7/56* (2006.01)
- *G06T 15/00* (2006.01)
- *G06T 15/50* (2006.01)
- *G06T 15/60* (2006.01)

(52) U.S. Cl. .......................................... 345/426; 703/5

(58) Field of Classification Search .................. 345/426
See application file for complete search history.

(56) References Cited

U.S. PATENT DOCUMENTS

| | | | | |
|---|---|---|---|---|
| 5,268,996 A | * | 12/1993 | Steiner et al. | 345/426 |
| 5,357,579 A | * | 10/1994 | Buchner et al. | 382/100 |
| 5,616,031 A | * | 4/1997 | Logg | 434/38 |
| 6,100,892 A | * | 8/2000 | Hicks et al. | 345/419 |
| 6,184,891 B1 | * | 2/2001 | Blinn | 345/426 |
| 6,677,947 B2 | * | 1/2004 | Woodbury et al. | 345/426 |
| 6,683,609 B1 | * | 1/2004 | Baron, Sr. et al. | 345/419 |
| 6,744,430 B1 | * | 6/2004 | Shimizu | 345/420 |
| 6,760,024 B1 | * | 7/2004 | Lokovic et al. | 345/421 |
| 6,762,760 B2 | * | 7/2004 | Deering | 345/426 |
| 6,850,236 B2 | * | 2/2005 | Deering | 345/428 |
| 6,891,534 B2 | * | 5/2005 | Futamura et al. | 345/419 |
| 6,897,878 B2 | * | 5/2005 | Cosman et al. | 345/611 |
| 6,940,504 B1 | * | 9/2005 | Mech et al. | 345/419 |
| 6,940,513 B2 | * | 9/2005 | Morgan, III et al. | 345/506 |
| 6,947,057 B2 | * | 9/2005 | Nelson et al. | 345/611 |
| 6,983,283 B2 | * | 1/2006 | Sowizral et al. | 707/102 |
| 6,989,831 B2 | * | 1/2006 | Ebersole et al. | 345/420 |
| 7,046,243 B1 | * | 5/2006 | Mech | 345/426 |

(Continued)

OTHER PUBLICATIONS

Foley, James D.; van Dam, Andries; Feiner, Steven k.; Hughes, John F.; "Computer Graphics Principles and Practice;" 1996, Addison-Wesley Publishing Company; Second Edition; pp. 1044-1046.*

(Continued)

*Primary Examiner*—Ulka Chauhan
*Assistant Examiner*—Crystal Murdoch
(74) *Attorney, Agent, or Firm*—Choate, Hall & Stewart, LLP; John D. Lanza; Christopher J. McKenna

(57) ABSTRACT

Systems and methods are provided for visually realistic simulation and real-time rendering of natural atmospheric lighting and related phenomena in an outdoor scene represented by an image provided by a simulation environment. The systems and methods of the present invention provide techniques to approximate the visual effects of natural atmospheric lighting and related phenomena that are visually realistic and that can be computed in real-time to render frames of a scene at real-time frame rates per second. The techniques consider the light scattering effects due to sunlight and ambient light in relation to objects, atmospheric particles and other scene elements represented by the image.

34 Claims, 26 Drawing Sheets

U.S. PATENT DOCUMENTS

| | | | |
|---|---|---|---|
| 7,058,511 B2 * | 6/2006 | Boright et al. | 702/3 |
| 7,095,423 B2 * | 8/2006 | Cosman et al. | 345/629 |
| 7,173,617 B2 * | 2/2007 | Driemeyer et al. | 345/426 |
| 2003/0011618 A1 * | 1/2003 | Deering | 345/613 |
| 2003/0222870 A1 * | 12/2003 | Driemeyer et al. | 345/426 |
| 2004/0001062 A1 * | 1/2004 | Pharr | 345/426 |
| 2004/0100466 A1 * | 5/2004 | Deering | 345/428 |
| 2005/0073682 A1 * | 4/2005 | Narasimhan et al. | 356/337 |
| 2006/0022976 A1 * | 2/2006 | Bredow et al. | 345/422 |
| 2006/0087509 A1 * | 4/2006 | Ebert et al. | 345/473 |
| 2006/0119600 A1 * | 6/2006 | Lokovic et al. | 345/426 |
| 2006/0176303 A1 * | 8/2006 | Fairclough | 345/426 |
| 2006/0181549 A1 * | 8/2006 | Alkouh | 345/629 |

OTHER PUBLICATIONS

Nielsen, Ralf Stokholm; "Real Time Rendering of Atmospheric Scattering Effects for Flight Simulators;" 2003, pp. 1-134.*

Harris, Mark; "Real-Time Cloud Rendering for Games;" Mar. 2002; Proceedings of Game Developers Conference 2002; pp. 1-8.*

Hoffman, et al. "Rendering Outdoor Light Scattering in Real Time.", 2002, ATI Technologies, Inc., 12 pages.

* cited by examiner

| Method, 1700 | | Approximation, 1705 |
|---|---|---|
| Take single sample of cloud density at current cloud coordinates offset by a small vector in the direction towards the light source | Step 1710 → | $\sigma$ |
| Obtain self-shadowing weighing constant | Step 1715 → | $k$ |
| Compute cloud self-shadowing opacity | Step 1720 → | $a_s = 1 - e^{-k\sigma}$ or $a_s = 1 - (1 - k\sigma/\gamma)^\gamma$ |

*Fig. 17*

SYSTEMS AND METHODS FOR THE REAL-TIME AND REALISTIC SIMULATION OF NATURAL ATMOSPHERIC LIGHTING PHENOMENON

TECHNICAL FIELD

The present invention generally relates to the real-time graphical processing and realistic simulation of natural atmospheric lighting phenomena.

BACKGROUND INFORMATION

Simulated images are used in various applications, such as training simulators, electronic games, and visual planning and modeling tools. Using realistic simulated images in such applications is desirable to visually present and represent real world scenarios as it may be seen by the human eye outside of the application. In particular, it would be desirable to realistically simulate an outside scene including terrain and sky and the naturally occurring effects of atmospheric light on the scene. Although some simulation applications, such as games, provide a believable representation of outside scenes, these applications do not represent natural atmospheric lighting phenomena in a visual or photo realistic manner. For example, it would be desirable in a military training simulator to present training scenarios that realistically simulate an outside natural scene, including terrain, sky and lighting effects. Simulations using realistic outside scenes will make the image synthesis process more intuitive and have a broader scope of applications.

However, the realistic simulation of outdoor scenes presents significant challenges because of the geometry and lighting effects naturally occurring in such environments. The shapes of natural objects found in outdoor scenes and the effect of light and illumination on these natural objects make it particularly challenging to realistically simulate. Outdoor scenes exhibit great geometric complexity, and the sheer scale of outdoor scenes is typically significantly larger than that of indoor scenes. Furthermore, outdoor scenes often contain natural objects that have complex shapes. The geometric representation of the physical features of varying land mass, sky line and other terrain and atmospheric objects can be quite complex. Another challenge with outdoor scenes is the complexity of the illumination itself. The sky essentially surrounds all objects in the outside scene. Natural illumination from the sun and the sky has special and naturally occurring reflective and optical properties. As such, the lighting effects from the natural illumination affect the color and brightness of objects, terrain and atmosphere in the outside scene.

The realistic and efficient simulation of outdoor scenes is even further challenging. In order to create realistic simulations of outdoor scenes, such as a photo realistic simulation of a terrain and sky, simulating and rendering the visual effects from natural atmospheric lighting phenomena is required. The simulation needs to take into account the interaction of atmospheric light with the natural and man-made objects in the outside scene and the dynamics of natural systems. However, the modeling of such natural atmospheric lighting phenomena is difficult. Although accurate mathematical models of atmospheric lighting phenomena exist, the execution of such models in a simulation environment is very time consuming with a heaving computational burden. Moreover, because outdoor scenes are geometrically complex, the execution of accurate models for atmospheric lighting phenomena integrated with the geometric complexity of the scene is even more time consuming. As such, these models are not executed in real-time.

Thus it is desired to realistically simulate and render in real-time natural atmospheric lighting phenomena in outdoor scenes. Systems and methods are needed to realistically simulate and render in real-time the complexity of natural objects in outdoor scenes integrated with the visual effects from atmospheric lighting phenomena.

SUMMARY OF THE INVENTION

The present invention provides systems and methods for providing visually realistic simulation and real-time rendering of natural atmospheric lighting and related phenomena in an outdoor scene represented by an image provided by a simulation environment. The systems and methods of the present invention provide techniques to approximate the visual effects of natural atmospheric lighting and related phenomena that are visually realistic and that can be computed in real-time to render frames of a scene at high frame rates per second. The techniques consider the light scattering effects due to sunlight and ambient light in relation to objects, atmospheric particles and other scene elements represented by the image.

Using the techniques, the present invention can provide images and simulations having visually realistic representations of sunlight at any time of day, including from dawn to twilight, along with accurate shadows. Additionally, the present invention can simulate a visually realistic representation of a wide range of cloud formations, resulting cloud cover over the landscape of a scene, and shadows cast by clouds on elements of the scene. Furthermore, the present invention provides a realistic simulation of the visual effects from light scattering by the cloud cover, and also provides visually realistic simulation of water including accurate reflections, refractions, and turbulence.

In one aspect, the present invention relates to a method for providing a realistic simulation of natural atmospheric lighting phenomenon. The method includes the step of providing in a simulation environment an image realistically representing a scene of natural atmospheric lighting phenomena having an atmosphere, atmospheric particles, and light. The image may provide a visual or photo realistic representation of an outdoor scene. The method further provides a viewing position and one or more viewing objects associated with a view of the scene. A viewing object may be any element of the image. The method of the present invention determines, in real-time, a color of one or more portions of the image to realistically represent one or more visual effects from the natural atmospheric lighting phenomena of the scene from a change in one or more of the following: the view, the viewing position, one or more viewing objects, atmosphere, atmospheric particles and light. The method renders, in real-time, images of the scene comprising the color of one or more portions of the image to realistically simulate the one or more visual effects.

In one embodiment, the method includes rendering at a frame per second rate of at least 10 frames per second. The method also determines the colors in real-time by performing processing at a rate to provide for realistically rendering at a frame per second rate of at least 10 frames per second. In one embodiment, the color comprises a Red-Green-Blue (RGB) color code, and the one or more portions of the image comprises a vector.

In other embodiments, the atmospheric particles represent a portion of one or more of the following: a cloud, rain, ice, dust, fog, haze, smoke, pollutants, and air. In a further embodiment, at least one of the one or more viewing objects represents one or more of the following: a sky, a cloud, a land mass, a celestial body, a body of water, and a man-made item. In the methods of the present invention, the light represents a portion of illumination from one of sunlight and scattering of light by atmospheric particles. In one embodiment, the step of rendering in the method of the present invention includes depicting a movement of at least one of the viewing objects in the scene.

In another embodiment, the method of the present invention determines the color by calculating a realistic approximation of a visible effect on the natural atmospheric lighting phenomenon from one or more of the following: in scattering light from atmospheric particles, out scattering light from atmospheric particles, sunlight illumination, ambient illumination, cloud appearance, cloud density, cloud lighting, and cloud shadowing.

In a further embodiment, the method determines the color from an effect of the atmospheric particles scattering out light between the viewing position and at least one of the one or more viewing objects by calculating an attenuation factor that realistically approximates a proportion of light reduced from the light reaching the viewing position from the viewing object. The attenuation factor may be wavelength dependent and derived from a calculation of a cumulative density of atmospheric particles along a path of the line of sight between the viewing position and at least one viewing object. In some embodiments, the cumulative density is proportional to the length of the intersection of a path of the line of sight with the atmosphere.

In one embodiment of the present invention, the method determines the color from an effect of the atmospheric particles scattering light into the line of sight between the viewing position and at least one of the one or more viewings object by calculating an additive factor that realistically approximates an increase to the light reaching the viewing position from the viewing object. The additive factor may be dependent on a selected horizon color and derived from a calculation of a cumulative density of atmospheric particles along a path of the line of sight between the viewing position and at least one viewing object. The cumulative density may be proportional to the length of the intersection of a path of the line of sight with the atmosphere.

In an additional embodiment, the method of the present invention determines the color from an effect of sunlight illuminating at a point in the atmosphere as viewed from the viewing point by calculating a sunlight attenuation factor that realistically approximates a proportion of sunlight reaching the point in the atmosphere. The sunlight attenuation factor may be derived from a calculation of a cumulative optical density for a dominant point along a path from the viewer towards the viewing object. The dominant point may include a point along the path having a dominant color and intensity of the sunlight.

In another aspect, the present invention relates to a system for providing a realistic simulation of natural atmospheric lighting phenomenon. The system includes a simulation environment, a simulation engine, and a rendering mechanism. The simulation environment provides an image realistically representing a scene of a natural atmospheric lighting phenomenon comprising an atmosphere, atmospheric particles, and light, and provides a viewing position and one or more viewing objects associated with a view of the image. The scene may be any outdoor scene. The one or more viewing objects can includes any element of the image.

The simulation engine of the present invention determines, in real-time, a color of one or more portions of the image to realistically represent one or more visual effects from the natural atmospheric lighting phenomenon of the scene from a change in one or more of the following: the view, the viewing position, one or more viewing objects, atmosphere, atmospheric particles and light. The rendering mechanism of the present invention renders, in real-time, images of the scene comprising the color of one or more portions of the image to realistically simulate the one or more visible effects.

In one embodiment, the rendering mechanism renders images at a frame per second rate of at least 10 frames per second. The simulation engine determines the color at a processing rate to provide an image for the rendering mechanism to render at a frame per second rate of at least 10 frames per second.

In another embodiment, the atmospheric particles represent a portion of one or more of the following: a cloud, rain, ice, dust, fog, haze, smoke, pollutants, and air. Additionally, at least one of the one or more viewing objects represents one or more of the following: a sky, a cloud, a land mass, a celestial body, a body of water, and a man-made physical item. The light represents a portion of illumination from one of sunlight and scattering of light by atmospheric particles. In a further embodiment, the simulation provided by the simulation environment depicts a movement of at least one of the viewing objects in the scene.

In one embodiment, the simulation engine of the present invention determines the color by calculating a realistic approximation of a visible effect on the natural atmospheric lighting phenomenon from one or more of the following: in scattering light from atmospheric particles, out scattering light from atmospheric particles, sunlight illumination, ambient illumination, cloud appearance, cloud density, cloud lighting, and cloud shadowing. In one embodiment, the color comprises a Red-Green-Blue (RGB) color code, and the one or more portions of the image comprises a vector.

In another embodiment, the simulation engine of the present invention determines the color from an effect of the atmospheric particles scattering out light between the viewing position and at least one of the one or more viewing objects by calculating an attenuation factor that realistically approximates a proportion of light reduced from the light reaching the viewing position from the viewing object. The attenuation factor may be wavelength dependent and derived from a calculation of a cumulative density of atmospheric particles along a path of the line of sight between the viewing position and at least one viewing object. Additionally, the cumulative density may be proportional to the length of the intersection of a path of the line of sight with the atmosphere.

In another embodiment of the present invention, the simulation engine determines the color from an effect of the atmospheric particles scattering light into the line of sight between the viewing position and at least one of the one or more viewings object by calculating an additive factor that realistically approximates an increase to the light reaching the viewing position from the viewing object. The additive factor may be dependent on a selected horizon color and derived from a calculation of a cumulative density of atmospheric particles along a path of the line of sight between the viewing position and at least one viewing object. The cumulative density may be proportional to the length of the intersection of a path of the line of sight with the atmosphere.

In other embodiments, the simulation engine of the present invention determines the color from an effect of sunlight illuminating at a point in the atmosphere as viewed from the viewing point by calculating a sunlight attenuation factor that realistically approximates a proportion of sunlight reaching the point in the atmosphere. Additionally, the sunlight attenuation factor may be derived from a calculation of a cumulative optical density for a dominant point along a path from the viewer towards the viewing object. The dominant point can include a point along the path having a dominant color and intensity of the sunlight.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 17 is a flow diagram depicting steps performed in an illustrative method of a technique of the present invention for determining a cloud self-shadowing;

DETAILED DESCRIPTION

Figure 1:
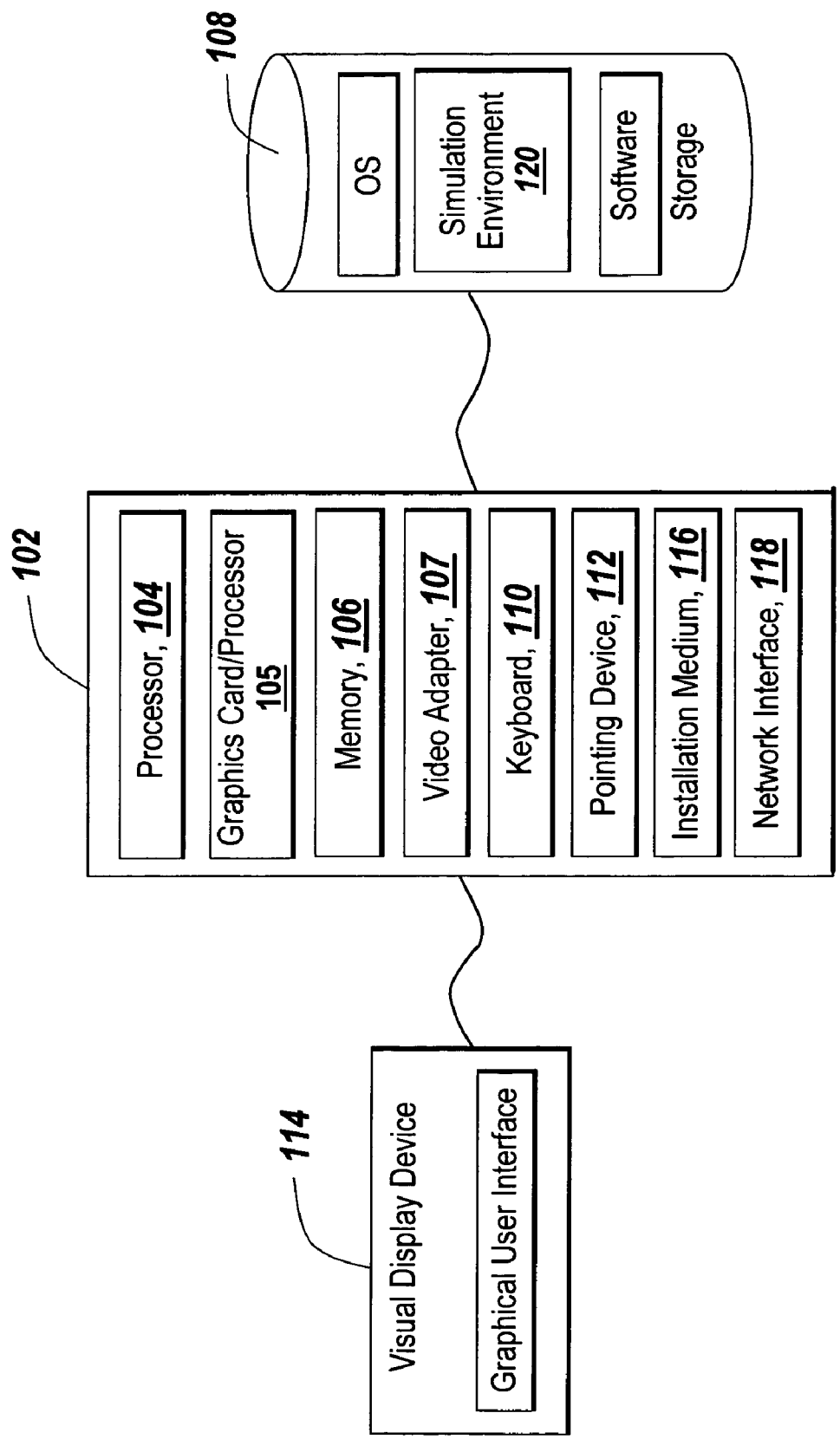
FIG. 1 is a block diagram of a computing device environment for practicing an illustrative embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the present invention provides systems and methods for visually realistic simulation and real-time rendering of natural atmospheric lighting phenomena in a simulation environment. The simulation environment provides an image of an outdoor scene including naturally occurring elements of an atmosphere such as the sky, sun light, clouds and other atmospheric particles and celestial objects. The outdoor scene may also include terrain with any naturally occurring land mass, body of water and/or man-made objects and structures. The simulation environment may provide a photo realistic, near photo realistic or otherwise substantially realistic representation of the outdoor scene.

The present invention provides approximations for determining the realistic visual effects of natural atmospheric lighting phenomena upon a scene provided by the image, such as the effects of light and illumination upon an object in the image. Natural atmospheric lighting phenomena include the out scattering and in scattering of light upon a view of one or more objects from the effects of Rayleigh and Mie scattering. Natural atmospheric lighting phenomena also include attenuation by the atmosphere upon light from the sun, e.g., the color of the atmosphere from the effects of a sunrise or sunset. The natural atmospheric lighting phenomena causes visual effects to the color, shading and brightness of objects in the scene of the image. Additionally, the present invention approximates the realistic appearance of clouds, the effect of sky illumination and light from the sun upon clouds, self shadowing effects of clouds, and shadows cast by clouds onto other objects in the scene.

The approximations are computationally efficient and provide for the real-time simulation and rendering of the image upon any type of changes in the scene or for executing a series of changes to the scene over time. The approximations can be executed to take into account the visual effects from natural atmospheric lighting phenomena upon all of the desired objects in the scene. Furthermore, the approximations can be executed at a speed to provide a real-time simulation frame rate of ten frames per second or greater, and in the exemplary embodiment to be discussed herein, at frame rates of 120 frames per second or more.

Moreover, the approximations provide for the realistic rendering of the natural atmospheric lighting phenomena upon the scene. The approximations provide for the color values of pixels of the image to be rendered on the screen. Although the approximations are more computationally efficient in comparison to more accurate modeling approaches of natural atmospheric lighting phenomenon, the approximations produce color values for the natural atmospheric lighting that are visually similar to the more accurate and computationally expensive modeling approaches. As such, the present invention also provides for the photo realistic, near photo realistic or otherwise substantially realistic representation of natural atmospheric lighting phenomena.

In brief introduction, the illustrative embodiment of the present invention provides approximations for natural atmospheric lighting phenomena that are both visually realistic and can be executed in real-time. This provides for the simulation of realistic outdoor scenes that can be rendered at a real-time frame rate. As such, the simulation environment of the present invention can provide for a wide range of graphics and simulation applications where the substantial realistic representation of outdoor scenes is desired. For example, the simulation environment of the present invention can be used for driving and flight simulators as well as military and other training environments. Additionally, the methods and systems of the present invention may be applied in gaming and entertainment type applications.

The illustrative embodiment will be described solely for illustrative purposes relative to a simulation environment using a shader type program in a programmable graphics processor, such as in a graphics card. Although the illustrative embodiment will be described relative to such an environment, one of ordinary skill in the art will appreciate that the present invention may be applied to other graphics and simulation environments capable of the operations described herein.

FIG. 1 depicts an environment suitable for practicing an illustrative embodiment of the present invention. The environment includes a computing device 102 having memory 106, on which software according to one embodiment of the present invention may be stored, a processor (CPU) 104 for executing software stored in the memory 106, and other programs for controlling system hardware. The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 114 such as a computer monitor, which may used to display a graphical user interface (GUI). The computing device 102 may include a video adapter 107 for providing for I/O operations with the visual display device 114.

The computing device 102 may include other I/O devices such a keyboard 110 and a pointing device 112, for example a mouse, for receiving input from a user. Optionally, the keyboard 110 and the pointing device 112 may be connected to the visual display device 114. Additionally, the computing device 102 may include any type of input device for receiving user input, such as a joystick. In other embodiments, the computing device 102 may include any type of haptic device, such as a vibration generating mouse or force feedback joystick. In some embodiments, the computing device 102 may include any form of input device used for training and simulation, such a flight or tank simulation input device of a military training simulator.

The computing device 102 may include other suitable conventional I/O peripherals. The computing device 102 may support any suitable installation medium 116, a CD-ROM, floppy disks, tape device, USB device, hard-drive or any other device suitable for installing software programs such as the simulation environment 120 of the present invention. The computing device 102 may further comprise a storage device 108, such as a hard-drive or CD-ROM, for storing an operating system and other related software, and for storing application software programs such as the simulation environment 120 of the present invention. Additionally, the operating system and the simulation environment 120 can be run from a bootable CD, such as, for example, KNOPPIX®, a bootable CD for GNU/Linux.

The computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any type of computer system such as a workstation, desktop computer, server, laptop, handheld computer, or other form of computing or telecommunications device that has sufficient processor power and memory capacity to perform the operations described herein.

Additionally, the computing device 102 may include a graphics card/processor 105 for handling one or more graphics processing functions of the computing device for displaying graphics, images, user interfaces, or any other type of visual element to the display device 114. In one embodiment, the computing device 102 includes an expansion card 105 that interprets drawing instructions sent by the central processor (CPU) 104, processes them via a dedicated graphics processor 105, and writes the resulting frame data to the frame buffer, also called or otherwise is part of the video adapter 107. The graphics processor 105 may perform one or more graphics processing functions such as bitmap transfers and painting, window resizing and repositioning, line drawing, font scaling and polygon drawing. The graphics processor 105 may be designed to handle these tasks in hardware at far greater speeds than the software running on the system's central processor 104. The graphics processor 105 may be any type of graphics processor, such as any graphic processing chip provided or manufactured by Nvidia Corporation of Santa Clara, Calif., or ATI Technologies, Inc. of Markham, Ontario. The graphics processor 105 may be part of any type of graphics card, such as any of the graphics cards incorporating the Nvidia graphics processor, such as Nvidia's series of nForce® and GeForce® graphics chip, or the Radeon® series of graphics cards from ATI Technologies. One ordinarily skilled in the art will recognize and appreciate the various types and wide range of graphics card/processors 105 that may be used in the computing device 102.

Although generally described as a graphics processor 105, or a processor dedicated to graphics processing functions, the processor 105 can be any type of general purpose processor (GPP), or any other type of integrated circuit, such as a Field Programmable Gate Array (FPGA), Programmable Logic Device (PLD), or Application Specific Integrated Circuit (ASIC). Furthermore, although the illustrative embodiment of the computing device 102 is described with a separate processor 105 for graphics related processing, the central processor 104 may provide for such graphics related processing. Alternatively, the computing device 102 may have multiple processors to distribute processing of computing tasks, along with any graphics processing functions. In one embodiment, the graphics card/processor 105 of the computing device 102 has multiple graphics processors, such as for example the dual GPU graphics card provided or manufactured by Giga-Byte Technology, Co. LTD of Taipei Hsien, Taiwan. In another embodiment, the graphics processor 105 performs graphics-oriented operations but also other computations, such as any operation of the processor 104, such as a CPU. One ordinarily skilled in the art will recognize and appreciate that any type of computing device with any type of processor may be used to perform the operations of the present invention as described herein.

The present invention provides a simulation environment 120 for generating, modeling, creating, editing or otherwise handling, manipulating and processing images. In brief overview, the simulation environment 120 provides a platform for image based design, processing, and simulation of outdoor and/or indoor scenes including naturally occurring atmospheres and terrains, naturally occurring dynamic systems, along with any man-made objects, structures and/or system. The simulation environment 120 may include one or more images 215 representing visually, graphically, or otherwise, a scene, such as an outside scene. For example, the image 215 may comprise a photo realistic, near photo realistic or otherwise substantially realistic representation of an outside scene including an atmosphere, such as a sky, sun, and clouds, and optionally, any type of terrain, such as a landscape, mountain range, and a body of water.

The simulation environment 120 includes a graphical user interface for interactively creating and working with images 215 and may also provide for simulating, editing, configuring, and processing the images 215. The simulation environment 120 may read, save, interpret, or otherwise process image files in any format known to one ordinarily skilled in the art. For example, the simulation environment 120 may process images 215 comprising data in any terrain data sources known by those skilled in the art. For example, the terrain data may be in the form of a digital elevation map (DEM) and/or digital lines graphics (DLG) of any available granularity and may come from any source, such as the Unites States Geographical Survey (USGS) at www.usgs.gov. In other embodiments, the simulation environment 120 may use any available satellite data. As such, the images 215 processed by the simulation environment 120 may comprise real world terrain data from actual geographic locations. Additionally, any terrain data may be generated, created/edited, or provided to represent a desired terrain. Furthermore, the terrain data may be processed from one format to another format as suitable or desired for processing by the simulation environment 120.

The simulation environment 120 may comprise any suitable configuration mechanism 250 for configuring any elements and properties of the image 215, the simulation and rendering of one or more images 215, and/or the simulation environment 120. The configuration mechanism 250 may comprise any type of user interface, such as a graphical user interface or command line interface. As such, it may comprise any user interface mechanisms such as menu items, forms, toolbars, etc. as known by ordinarily skilled in the art to provide a user interface to receive user input with regards to configuration.

The simulation environment 120 also comprises one or more libraries 240 to provide for the processing of images and at least a portion of the operations of the present invention described herein. Although described as libraries 240, the libraries 240 may take the form of any type of executable instructions capable of performing the operations described herein. In one embodiment, the simulation environment 120 uses a terrain implementation library 240 for providing a terrain processing engine, or terrain engine, for loading and processing geometric data representing various terrains and atmospheres, such as outside scenes. The terrain engine may receive the geometric data for a terrain in the form of an array of heights. In an exemplary embodiment, the terrain engine comprises a geo-mipmapping system, and includes trilinear mipmapping extensions as known by those ordinarily skilled in the art. In one embodiment, the terrain implementation library 240 is capable of loading and processing terrain data files (.ter) provided with the Terragen™ software manufactured by Planetside Software of Cheshire, United Kingdom.

In an exemplary embodiment, the libraries 240 include a portion of executable instructions from the Object Oriented Graphics Rendering Engine (OGRE) manufactured by The OGRE Project. OGRE is a scene-oriented, flexible 3D engine that uses underlying system libraries like Direct3D, DirectX, and OpenGL®. As such, the libraries 240 may include the Direct3D or DirectX SDK manufactured by Microsoft Corporation of Redmond, Wash., to provide an application programming interface (API) in the operating system to graphics and sounds functionality provided by the hardware of the computing device 102. In some embodiments, the libraries 240 include any application programming interfaces, APIs, supporting the OpenGL standards and specifications as known by those ordinarily skilled in the art.

Additionally, the libraries 240 may include any portion of the CG Toolkit manufactured by Nvidia, Inc. of Santa Clara, Calif., wherein Cg is a high level language for graphics programming. The libraries 240 may also include any portion of executable instructions manufactured by The Freetype Project, located at www.freetype.org, which is a high quality, portable font engine, and in other embodiments, may include any suitable font engine. Additionally, the libraries 240 may include any executable instructions of the Developer's Image Library (DevIL) manufactured by Denton Woods, located at http://openil.sourceforge.net. DevIL provides a programmer's library to develop applications with image loading capabilities. DevIL utilizes a simple and powerful, syntax to load, save, convert, manipulate, filter and display a wide variety of image formats.

The libraries 240 of the simulation environment 120 may include any programming related APIs and libraries, such as STLport manufactured by STLport Consulting of San Francisco, Calif., Xerces of the Apache XML Project provided by the Apache Software Foundation, Inc. of Forest Hill, Md., and any publicly available libraries authored by Beman Dawes and David Abrahams, located at www.boost.org. Additionally, to support file and data compression related functionality in the simulation environment 120, the libraries 240 may include any type of compression libraries such as the Zlib library provided by The GNU Project of the Free Software Foundation of Boston, Mass. Furthermore, the libraries 240 may include windowing and graphical widgets for graphics APIs and engines such as Crazy Eddie's GUI System, located at http://www.cegui.org.uk, which is a publicly available object orientated tool for building graphical user interface systems.

The simulation environment 120 comprises a simulation engine 220 and rendering mechanism 210. The simulation engine 220 provides the graphics processing 225 functionality and instructions of the present invention for image simulation and the rendering of the image 215 via the rendering mechanism 210. The rendering mechanism 210 includes means and mechanisms as known by those ordinarily skilled in the art to cause the rendering of the image 215 to the visual display device 114 of the computing device 102. In the rendering stage of graphics/image processing, typically performed by the graphics card/processor 105 in conjunction with the video adapter 107, the pixels are drawn to the video display device 114.

The graphics processing 225 portion of the simulation engine 220 may comprise one or more shader programs, such as a pixel shader program 230 and/or a vertex shader program 235. The terms "shaders" may be used instead of program or shader program to refer to the portions of executable instructions that program certain parts of the graphics processing pipeline. The computational frequency that may be supported in graphics related hardware, such as a graphics card/processor 105, is per vertex and per pixel/fragment. As such, there are two different kinds of shaders: vertex shaders 235 and pixel shaders 230. A pixel shader 230 provides graphics processing on a pixel basis, and a vertex shader 235 provides graphics processing on a vertex basis.

Pixel shaders 230 may also include or be referred to as fragment shaders. As known by those ordinarily skilled in the art, fragments are all the points of three-dimensional scene that are projected onto a two-dimensional xy-plane, such as in an OpenGL® based implementation. A fragment contains information such as position and texture coordinates, and several fragments can be added together when displayed to a pixel on the screen.

As known by those ordinarily skilled in the art, a vertex shader 235 is a set of graphics processing instructions used to add special effects to objects in a three-dimensional (3D) environment by performing mathematical operations on an object's vertex data. Objects in a 3D scene, such as those provided by the image 215 of the simulation environment 210, may be described using polygons such as triangles, which in turn are defined by their vertices. Vertex data refers to the data set identifying and/or describing the vertices of the triangles representing the 3D scene. A vertex shader 235 can change the position or any other attributes of a vertex. Vertex shaders 235 may get executed for each vertex that passes through the graphics processing pipeline.

Pixel shaders 230 as known by those ordinarily skilled in the art are graphics processing instructions that calculate effects on a per-pixel basis. In some embodiments, the pixel shader 230 receives as input computational results from a vertex shader 235, such as the vertex position. The pixel shader 230 uses input provided by the vertex shader 235 and any other attributes, such as user-defined attributes, generated or modified colors and texture coordinates, and combines the information to form a final color value that gets passed to the final stages of rendering. As such, per-pixel shading provides the lighting, color, and shading of each pixel. Pixel/fragment shaders 230 get executed for each pixel/fragment passing through the graphics processing pipeline for rendering.

With the graphics cards/processor 105 of the computing device 102 being programmable, the pixel shader 230 and vertex shader 235 can comprise customized executable instructions to provide desired graphics processing of vertex and pixel/fragment data associated with the image 215. In an exemplary embodiment, the simulation environment 210 provides at least a portion of the real-time execution of the realistic approximation of natural atmospheric lighting phenomena of the present invention via one or more vertex shaders 235 and/or pixel shaders 230.

The simulation environment 120, and any portion thereof, can be an application, module, library, software component, or any other type of computer program or executable instruction which is designed to and capable of executing the functionality of the simulation environment 120 as described herein. Additionally, the simulation environment 120, and any portion thereof, may be executed as an application, program, service, process, task, or any other form of execution unit known by those skilled in the art. Furthermore, the simulation environment 120, and any portion thereof, may be designed to run on any type of processor 104, 105 microprocessor, operating system, or computing device 102.

The simulation environment 120 can be capable of and configured to operate on and take advantage of different processors of the computing device 102. For example, the simulation environment 120 can run on a 32 bit processor of one computing device 102 and a 64 bit processor of another computing device 102'. Additionally, the simulation environment 120 can be capable of and configured to operate with and take advantage of different graphical cards/processors 105 of the computing device 102. For example, any shader program 230, 235 of the simulation engine 220 may be designed to operate on and take advantage of any type of graphical processor 105. Furthermore, the simulation environment 120 can operate on computing devices 102 that can be running on different processor architectures with different graphical processing cards and processors in addition to different operating systems. One ordinarily skilled in the art will recognize the various combinations of operating systems, processors, or graphical cards that can be running on the computing device 102. In summary, the simulation environment 120 may be deployed across a wide range of different computing devices, different operating systems, and different processors in various configurations. One ordinarily skilled in the art will appreciate the various ways the present invention may be practiced in a computing device.

Figure 3A:
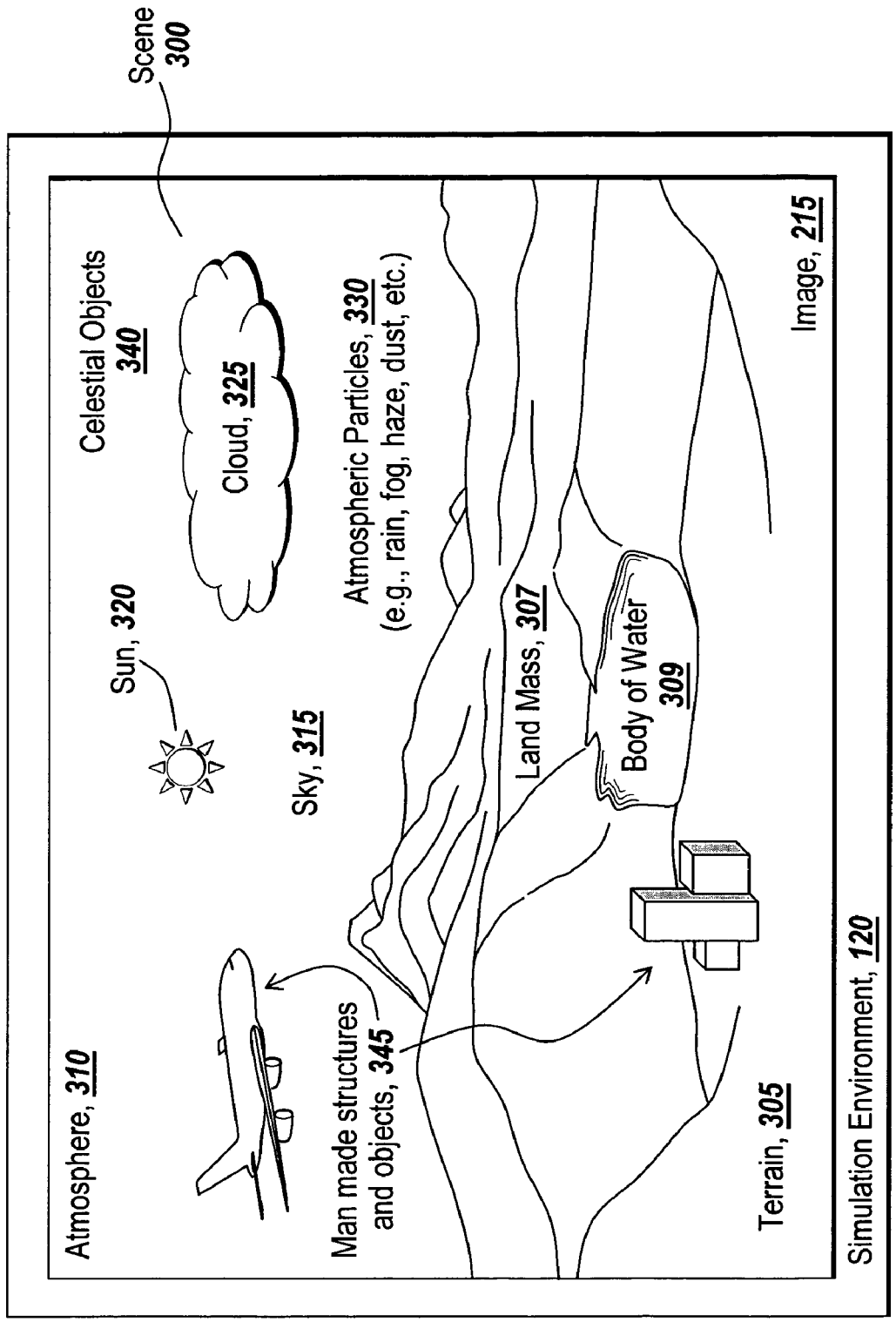
FIG. 3A is a diagrammatic view of a graphical image of a natural atmospheric scene in the simulation environment in an illustrative embodiment of the present invention.

In one aspect of the present invention, the image 215 provided by the simulation environment 120 comprises a realistic graphical and/or visual representation of an outdoor scene including a natural atmospheric environment. FIG. 3A depicts a diagrammatic view of an illustrative image 215 of a scene 300, such as an outdoor scene. In one embodiment, the image 215 is a photo realistic, near photo realistic or otherwise substantially realistic representation of the outdoor scene 300, which may also be known as or referred to as visual realistic. The scene 300 may comprise any combination of naturally occurring and/or man made objects. In brief overview, the scene 300 may comprise a terrain 305 and an atmosphere 310. The terrain 305 may include any physical features and characteristics of a planet's surface, such as the earth or any other orbiting celestial object 340. As such, the terrain 305 may include a landscape with any type of land mass 307 and one or more bodies of water 309. For example, the land mass 307 may include any type of mountain or hill, or any range of mountains and hills. The bodies of water 309 may be any type of water such as a puddle, pond, lake, sea or ocean. Additionally, the terrain 305 may include any man-made objects and/or structures 345, such as vehicles, buildings, houses, and bridges. For example, the terrain 305 may provide a realistic representation of any man-made structures or objects 345 seen in any city, town, or country side known in the world. Also, the terrain 305 may include any flora or any other type of animal or creatures, either living or fictional. Additionally, the terrain 305 may include any fauna, or any other type of plant-life or vegetation, either actual or fictional.

The atmosphere 310 represented by the scene 300 of the image 215 may include the sky 315, a sun 320, one or more clouds 325, one or more celestial objects 340, and one or more types of atmospheric particles 330. The clouds 325 may be any type and/or any portion of a formation of a cloud. The atmosphere 310 may represent any portion of the atmosphere of the earth, or any other planet or orbiting celestial land mass. The celestial objects 340 may be any naturally occurring objects in the atmosphere, sky, or space, such as the sun, moon, a planet and a star. The atmosphere 310 generally represents air molecules, such as clean air molecules, that may be available in any portion of the sky 315 or atmosphere 310 of the scene 300. The atmosphere 310 may include any man-made objects such as aircraft or satellites. Additionally, the atmosphere 310 may include any flora, or any other type of animal or creature, either living or fictional. The atmospheric particles 330 represent portions of the atmosphere 310 other than air molecules, such as ice, rain, water droplets, crystals, snow, fog, haze, dust, smoke, pollutants, and any other particles, solid or otherwise, that may be an element of the atmosphere 310 and/or sky 315.

Although the scene 300 is generally described as a photo or near photo realistic representation of known and existing terrain 305 and atmosphere 310, the scene 300 may provide a photo or visual realistic representation of fictional terrain 305 and atmosphere 310. Instead of the terrain 305 and/or atmosphere 310 of the scene 300 of the image 215 being provided by terrain data related to actual measurements of terrain and atmospheric components related to the earth, the terrain 305 and/or atmosphere 310 may be generated or otherwise provided to realistically represent an imaginary scene 300. As such, the scene 300 may not be a scene of a terrain 305 and atmosphere 310 existing in the world but nevertheless may look as an actual existing terrain 305 and atmosphere 310 due to the photolistic or visual realism of the image 215.

In order to provide for photolistic realism or otherwise visually realistic representation of the scene 300, the effect of the physics of light and optics needs to be considered for the many objects of the terrain 305 and/or atmosphere 310, and the dynamic interactions between them. For example, the effect of light from the sun 320 and the sky 315 along with shadows casted by clouds 325 need to be considered to determine the color of a rendered object in the image 215 as seen by a viewer from a certain viewing position with respect to a view of the scene.

Figure 3B:
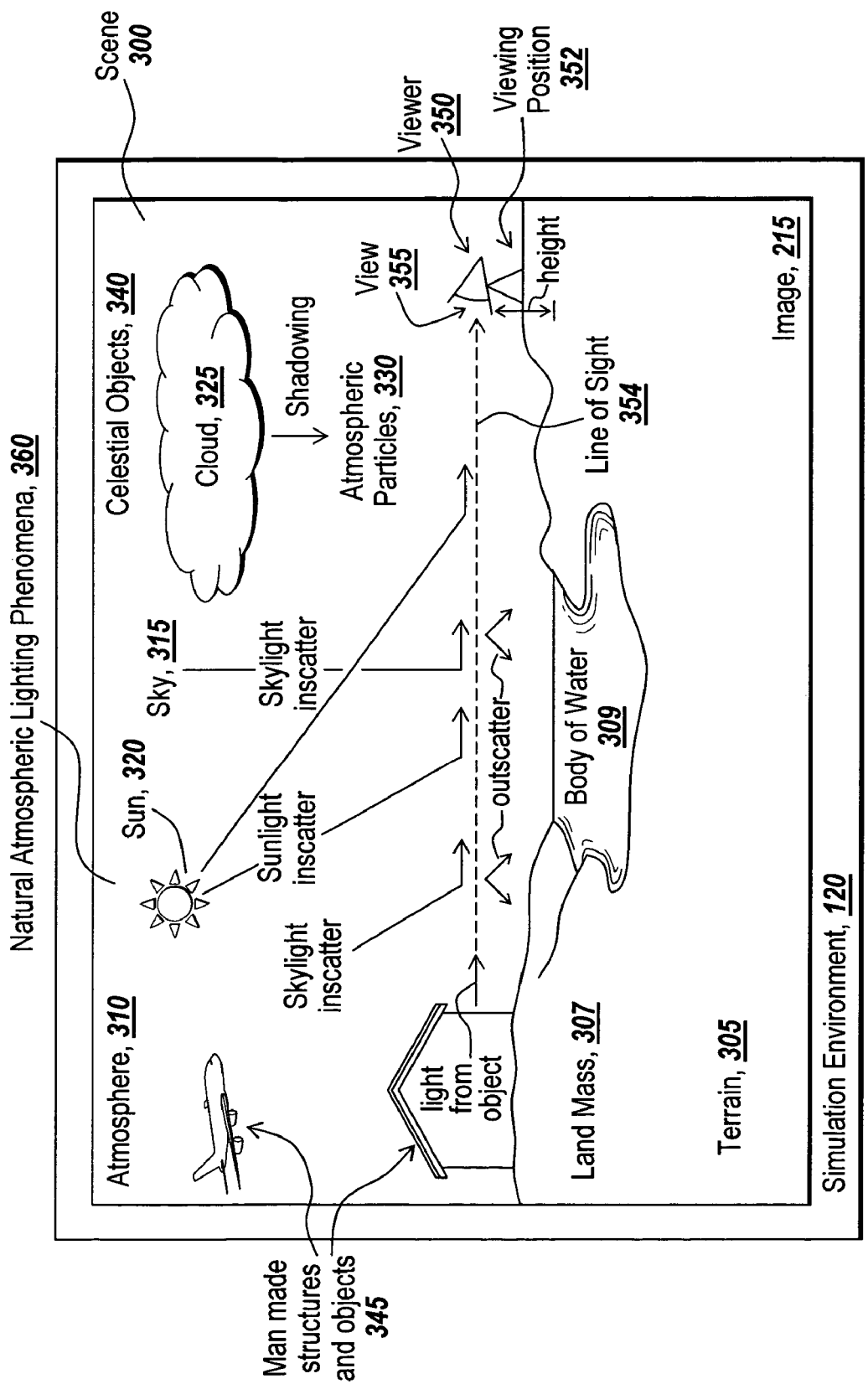
FIG. 3B is a diagrammatic view illustrating the natural lighting atmospheric phenomena to be simulated and rendered by the simulation environment of the present invention.

In another aspect, the present invention relates to the simulation and rendering of the natural atmospheric lighting phenomena associated with the scene 300 of the image 215, and any objects of the scene 300. FIG. 3B is a diagrammatic view of natural atmospheric lighting phenomena 360 considered by the methods and systems of the present invention. The realistic simulation and rendering of a sky 315 and the atmosphere 310 relies on the determination and calculation of two types of scattering phenomenon: Rayleigh scattering and Mie scattering. The illumination and color of the sky 315 and the gradual extinction and attenuation of the color of a viewed object in the scene 300 is caused by atmospheric light scattering.

Scattering is the process by which small particles, such as atmospheric particles 330, suspended in a medium of a different index of refraction diffuse a portion of the incident light in all directions. Along with absorption, scattering is a major cause of the attenuation of light from the sun 320 and the sky 215 by the atmosphere 310. Scattering varies as a function of the ratio of the atmospheric particle 330 diameter to the wavelength of the light. As known by those ordinarily skilled in the art, Rayleigh scattering is the scattering of light by particles smaller than the wavelength of the light. Rayleigh scattering occurs when light travels in transparent solids and liquids, but is most prominently seen in gases. The amount of Rayleigh scattering that occurs to a beam, or ray, of light is dependent upon the size of the atmospheric particles 330 and the wavelength of the light. By Rayleigh's law, the intensity of scattered light varies inversely with the wavelength of the light.

A scattering of sunlight from atmospheric particles 330 is the reason why the light from the sky 315 is blue. The strong wavelength dependence of the scattering means that blue light is scattered much more than red light. In the atmosphere 310, this results in blue photons being scattered across the sky 314 to a greater extent than photons of a longer wavelength, and so one sees blue light coming from all regions of the sky 315 whereas the rest is still mainly coming directly from the sun 320. A notable exception occurs during sunrise and sunset. The light of the sun 320 passes through a much greater thickness of the atmosphere 310 to reach a viewer 350 on the ground. This extra distance causes multiple scatterings of blue light with relatively little scattering of red light. This is seen by the viewer 350 as a pronounced red-hued sky 315 in the direction towards the sun 320.

If the size of the atmospheric particles 330 are larger than the wavelength of light, the light is not separated and all wavelengths are scattered as by a cloud 325 which appears white. Scattering of light from the sky 315 and/or sun 320 from atmospheric particles 330 of about the same size, or larger, as the wavelength of the light is handled by the mathematical-physical theory of Mie's law. Under Mie's law, as one ordinarily skilled in the art will appreciate, the scattering of all atmospheric particle 330 diameters to light wavelength ratios are considered. One ordinarily skilled in the art will recognize and appreciate Mie and Rayleigh's law, and the natural atmospheric phenomenon 360 of light scattering described by the mathematical-physical theory of Mie and Rayleigh's law.

In association with the scene 300 and the image 215, a viewing position 352 of a viewer 350 is provided to determine a view 355 of the scene 300 provided by the image 215. The viewing position 352 of the viewer 350 may be determined to be at a certain height in relation to the terrain 305 and/or the atmosphere 310. The viewing position 253 may comprise a location, a height and/or orientation of the viewer 350 relative to the scene 300, such as any projected coordinate system used by the simulation environment 120. A line of sight 354 to a viewing object is formed from the viewing perspective of the viewing position 352 of the viewer 350 to a target object in the scene 300, such as any element of the terrain 305 and/or atmosphere 310. Changes in the viewing position 352 of the viewer 350 changes the view 355 of the scene 300 of the image 215.

As depicted in FIG. 3B, atmospheric light scattering can cause light to be scattered into the line of sight, e.g., inscatter, scattered out of the line of sight, e.g., outscatter, or aborbed into the line of sight. The natural atmospheric lighting phenomenon 360 caused by atmospheric light scattering will vary by the geometry of the scene 300 and the atmospheric particles 300 along with the position and orientation of objects in the scene 300. Furthermore, natural atmospheric lighting phenomenon 360 caused by atmospheric light scattering will vary with the time of day, weather and pollution. Additionally, the atmospheric composition of different planet atmospheres will impact atmospheric light scattering.

Although natural atmospheric lighting phenomena 360 is generally discussed above in relation to atmospheric light scattering in view of Rayleigh and Mie scattering theories, natural atmospheric lighting phenomena 360 encompasses any of the physical and mathematical relationships of light and optics, and associated phenomenon thereof related to any element of the scene 300 represented by the image 215. Additionally, the systems and methods of the present invention takes into account the visual effects of sunlight attenuation by the atmosphere 310, such as the effects of a sunrise and sunset on the color of the sky 315 and any other element of the scene 300. Furthermore, the present invention considers the visual effects associated with clouds 325, such as the density and color of clouds, self-shadowing by clouds, illumination and lights of clouds along with shadows casted by clouds. One ordinarily skilled in the art will appreciate and recognize the many light associated phenomenon that may be taken into account for an outdoor scene used in practicing the operations of the present invention as described herein.

Figure 4A:
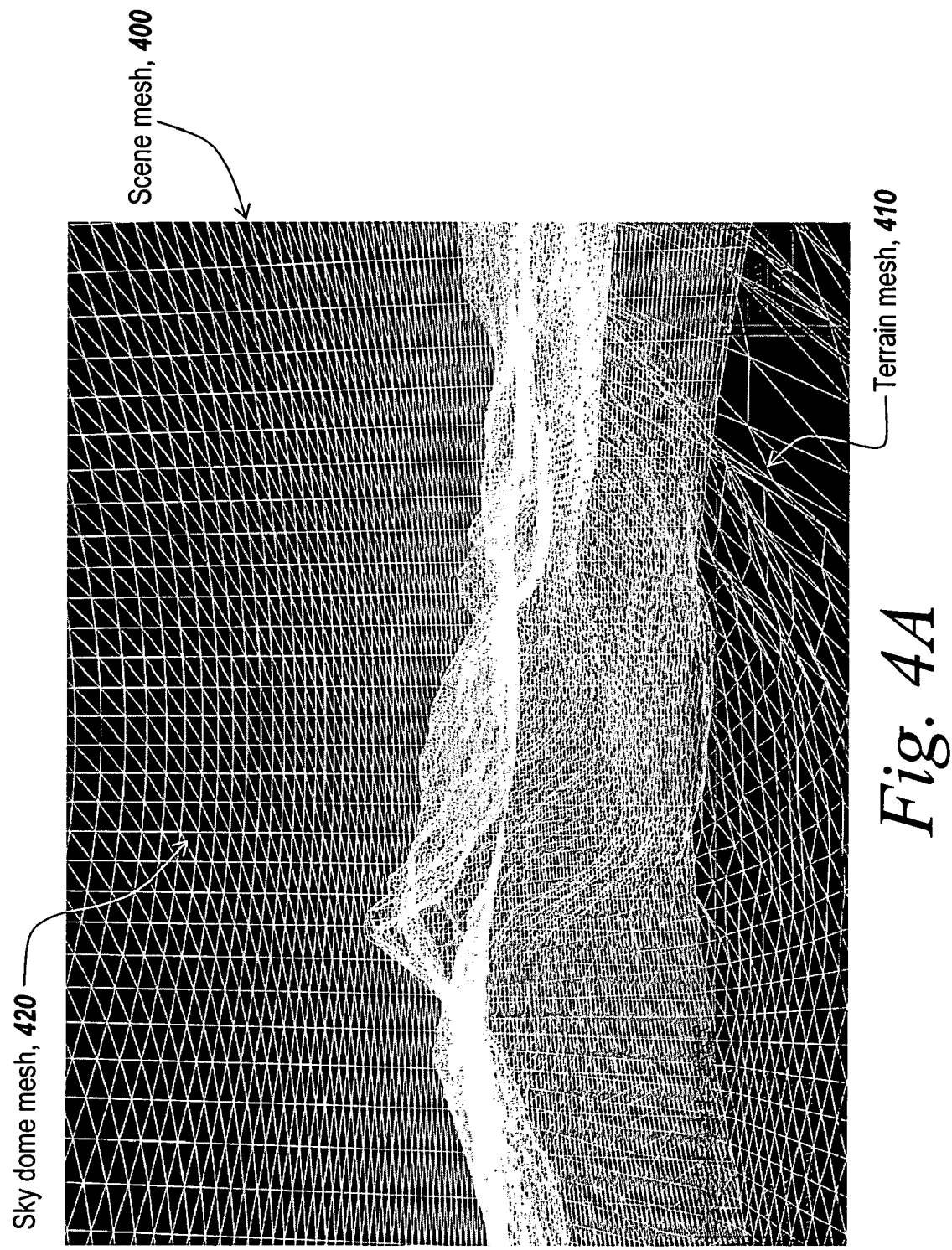
FIG. 4A is a diagrammatic view of an illustrative scene mesh for practicing an embodiment of the present invention.

As a realistic representation, the image 215 represents a three-dimensional (3D) view of the outdoor scene 300. This 3D representation needs to be projected and rendered to a two-dimensional (2D) display of the visual display device 114 of the computing device 102. FIG. 4A depicts an illustrative scene mesh 400 for geometrically representing the terrain 305 and atmosphere 310 of the scene of the image 215. A mesh 400 is a graphics object composed of polygons, for example, triangles or quadrilaterals, that share vertexes and edges, and thus can be transmitted in a compact format to a graphics processor 105. The mesh 400 is used to depict, project, and/or transform 3D images to a 2D perspective. As shown in FIG. 4A, the illustrative mesh 400 used in an exemplary embodiment of the present invention is a series of triangles grouped together to form a surface. In a brief overview, the screen mesh 400 comprises a terrain mesh 410 and a sky dome mesh 420 integrated to form a geometric polygon representation of the scene 300 of the image 215. The terrain mesh 410 provides a mesh for the terrain portion of the scene 300 and the sky dome mesh 420 for the atmosphere 410 and sky 415 portion of the scene 300. In an exemplary embodiment, the atmosphere's geometry is defined as the set of all points below an infinite plane with some user-specified height above the viewer 350, although more complex models can be used as known by those ordinarily skilled in the art.

Figures 4B, 4C:
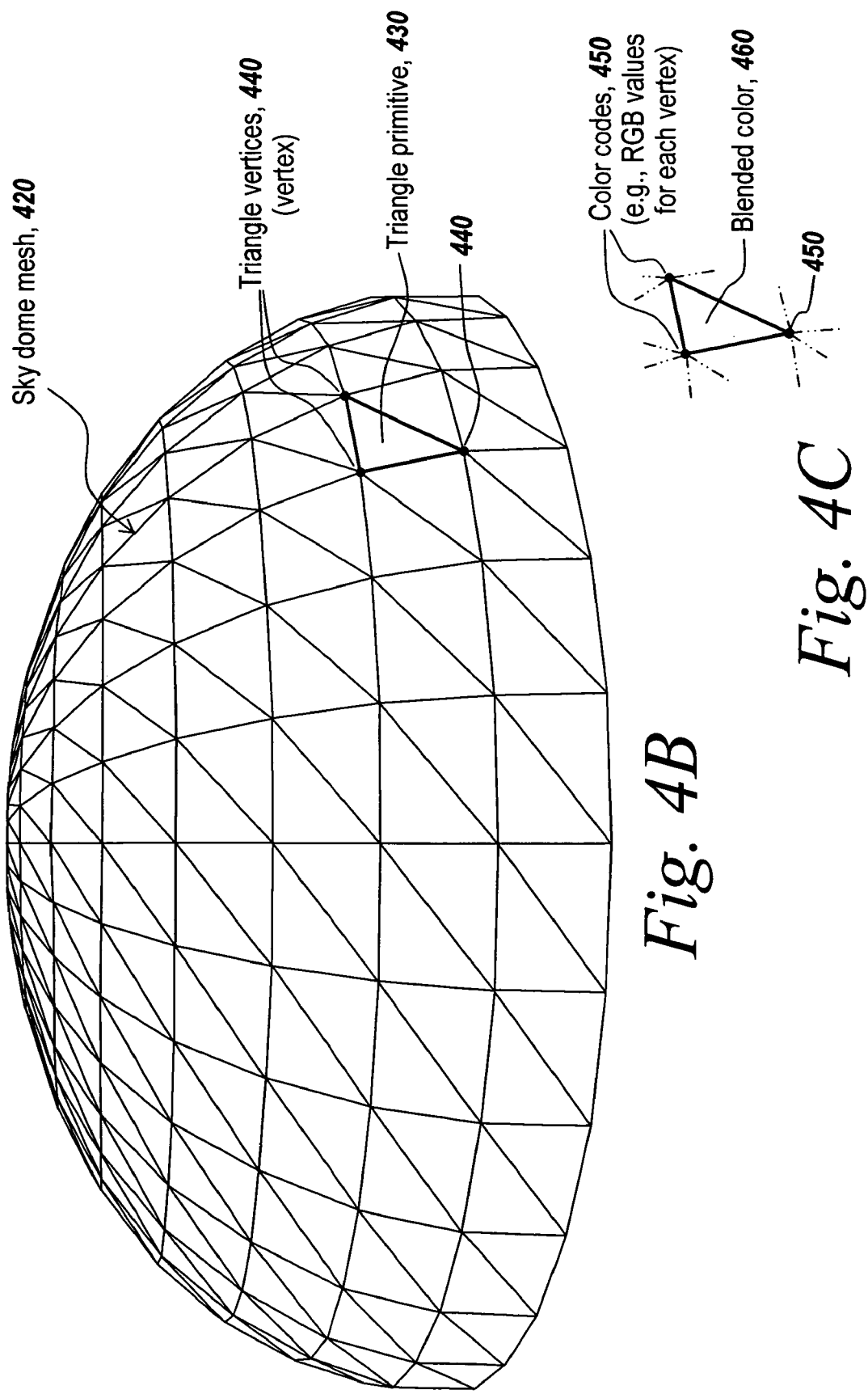
FIG. 4B is a diagrammatic view of an illustrative sky dome mesh for practicing another embodiment of the present invention.
FIG. 4C is a block diagram of an illustrative graphical processing object in practicing an illustrative embodiment of the present invention.

FIG. 4B depicts an illustrative wire screen rendering of the sky dome mesh 420. For illustrative purposes and by way of example, the sky dome mesh 420 comprise multiple triangle primitives 430. In computer graphics processing, a primitive 430 is a fundamental shape or object used primarily in the construction of more complex objects. In the example of FIG. 4B, the sky dome mesh 420 is a complex polyhedron made up of a series of connected triangle primitives 430. Each corner of a triangle primitive 430 forms a vertex 440, and each triangle primitive 430 has three vertices 440. A vertex 440 is the point where the sides of a polygon meet. That is, a vertex is a point in 3D space that defines a corner of one or more polygons, such as the triangle primitive 430. Although the present invention is illustrated using a triangle primitive 430, any type of suitable shape or polygon may be used for geometric representation of an image 215. Increasing the number of primitives or polygons of a mesh 400 enables more detailed and complex geometric representation of a scene 300. As such, increasing the number of polygons geometrically representing the image 215 improves the visual realism of rendering the scene 300.

To provides a realistic simulation and rendering of the scene 300, the colors of the triangle primitives 430 need to be determined to provide colors of the viewed object or element represented by the triangle primitive 430 such that the color is visually realistic in view of the simulation of the natural atmospheric lighting phenomena 360 occurring in the scene 430. In one embodiment, a color 450 for each vertex 440 of a triangle primitive 430 is determined and some form of color blending 460 is provided for a smooth transition of color between the vertices 440 of the triangle 430. For example, any form of color averaging or interpolation may be computed. Any suitable color blending technique known by one ordinarily skilled in the art may be used to color the primitive 430 used in the mesh 400 representation of the image 215.

In graphical processing, RGB color codes may be used to provide the colors associated with the triangle primitives 430. RGB color codes provide values for the primary colors of red, green, and blue which are mixed to display the color of pixels on a visual display device 114, such as a color monitor. Every color of emitted light can be created by combining the three colors of red, green, and blue in varying levels. Adding no color such as an RGB color code of (0,0,0) produces black, and adding 100 percent of all three colors, e.g., RGB color codes of (100, 100, 100) results in white. Furthermore, the color coding schemes of HLS (Hue, Luminance, Saturation) and/or HSV (Hue, Saturation, Values) as known by those skilled in the art may be used in practicing the present invention. As such, the color of a primitive 430, a rendered pixel, or an object of the scene 430 may be described also in terms of its brightness and/or intensity.

Alternatively, other color coding schemes may be used such as a CMY or CMYK color codes. CMY is a color space consisting of the subtractive primary colors of cyan, magenta, and yellow. These three subtractive primary colors are used in color negative printing, and some output devices, to produce a full gamut of color. CMYK is a cyan, magenta, yellow, and black color space. CMYK are the base colors used in printing processes and also a color mode used to define colors in a digital image. One ordinarily skilled in the art will recognize and appreciate the various color coding that may be used in practicing the present invention as described herein.

In one aspect, the present invention provides techniques for determining the color of the triangle primitives 430 of a mesh 400 to graphically render the scene 300 to realistically represent the natural atmospheric lighting phenomena 360. These techniques enable the graphical processing and rendering of the simulation of the natural atmospheric lighting phenomena 360 to occur at a real-time rate of greater than ten frames per second and upwards of 120 frames per second or more, depending on the computing device 102. Furthermore, these techniques not only provide for real-time rendering speeds but also provide for the photo realistic, near photo realistic, visually realistic or otherwise substantially realistic simulation of natural atmospheric lighting phenomena 360. As such, the present invention provides a simulation environment 120 that can simulate and render images 215 in real-time and in a continuous manner to show the realistic visual effects of natural atmospheric lighting phenomena 360 upon changes to elements of the image 215. For example, the viewing position 352 of the viewer 250 may change causing a different view 355 of the scene to be considered or a different line of sight 354 on an element of object being viewed. Additionally, a man-made object 345 may be positioned or moved through the scene 300 causing a change of the lighting effects of the scene 300 to be considered. Any of the elements of the terrain 305 and/or atmosphere 310 may be changed, such as the addition, deletion or modification of a portion of atmospheric particles 330. For example, the effect of rain, fog or haze may be added or deleted from the scene 300, or the density and/or pattern of such atmospheric particles 330 may be adjusted.

Figure 2:
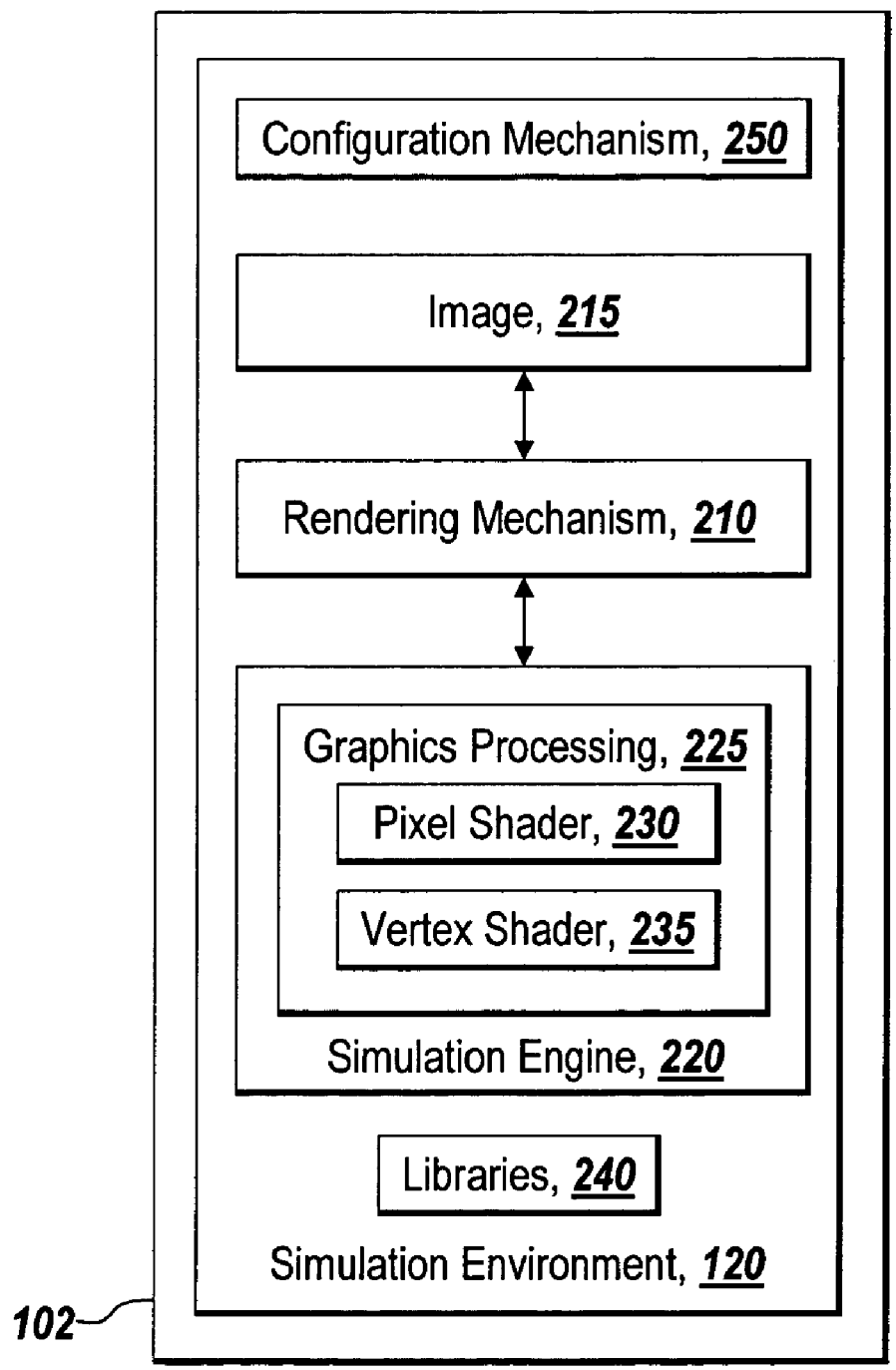
FIG. 2 is a block diagram of an illustrative simulation environment for practicing an embodiment of the present invention on the computing device of FIG. 1.
Figure 5:
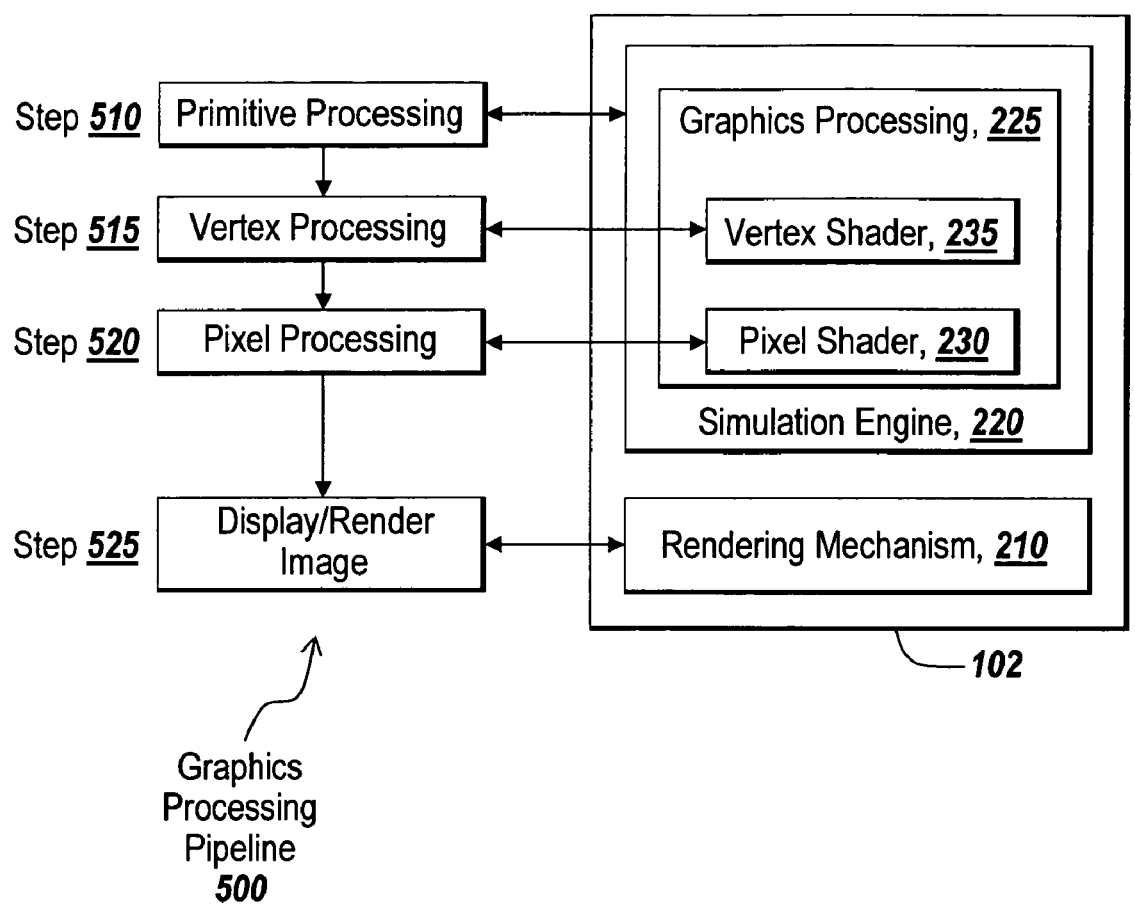
FIG. 5 is a flow diagram depicting steps performed in an illustrative method of a graphics processing pipeline in an illustrative embodiment of the present invention.

FIG. 5 depicts an illustrative method 500 of graphics processing of the present invention practiced in conjunction with the illustrative embodiment of FIG. 2. The illustrative method 500 represents at least a portion of the functionality of a typical graphics processing architecture, also referred to and known in the art as a graphics processing pipeline. The graphics processing pipeline depicted by illustrative method 500 may consider and perform any graphics processing functions known by those ordinarily skilled in the art in fixed-function or programmable graphics related hardware. The illustrative method 500 of the present invention performs primitive processing at step 510, vertex processing at step 515, pixel processing at step 520 and rendering at step 525. Primitive processing of illustrative step 510 may include any type of processing performed by the graphics card/processor 105 and/or the graphics processing portion 225 of the simulation engine 220 on a primitive 430, such as the triangle primitives of the scene mesh 400.

In an exemplary embodiment, the graphics processing pipeline depicted by illustrative method 500 is programmable via shaders 230, 235. As such, a vertex shader 255 of the graphics processing 225 portion of the simulation engine 220 may provide desired vertex processing operations at step 515 to provide for the realistic simulation and real-time rendering of the natural atmospheric lighting phenomena 360 of the present invention. Likewise, a pixel shader 230 may provide desired pixel/fragment processing operations at step 520 to provide for the realistic simulation and real-time rendering of the natural atmospheric lighting phenomena 360 of the present invention.

At step 525 of the illustrative method, the final colors 450 of each of the primitives 430 of the mesh 400 representation of the image 215 are rendered as pixels to a visual display device 114. Via the rendering mechanism 210, pixels are written and/or read to the frame buffer of the video adapter 107 of the computing device 102. There may be hundreds to thousand or more polygons for each frame of a scene 300 which must be updated and transmitted to the frame buffer. The frames are further processed, converted or transformed into suitable analog and or digital output signals of the visual display device 114. The rate of transfer to the frame buffer and/or visual display device 114 is known as frame rate and is measured in frames per second (fps). Each frame of a scene must be updated and transmitted through the frame buffer at a certain rate to give the illusion of movement.

Typically, movies at movie theaters are provided at a rate of 24 frames per second, and some television shows at 30 frames per second. The illusion of movement by the human eye can be seen at 10 frames per second or more, and typically, more fluid motion of a scene, at 24 to 30 frames per second or more. As known by ordinarily skilled in the art, blurring and sharpness of each frame of the scene 300 affects the perceived fluidity of the movement depicted in the simulation. Also, the level of details rendered in the scene 300 affects the frame rate per second needed to provide for fluid movement in a simulation. In general, the more frames per second, the smoother the simulation. One ordinarily skilled in the art will appreciate and recognize frames per second determinations and associated factors and considerations in the environment of the present invention.

The techniques of the realistic approximations of the natural atmospheric lighting phenomena 360 of the present invention will be discussed in detail below and generally in the context of FIG. 5. In an exemplary embodiment, the approximations of the physical and mathematical relationships of the natural atmospheric lighting phenomena 360 will be implemented and executed in one or more vertex 235 and/or pixel shader 230 executable instructions. Although discussed as implemented in shaders 230, 235, the techniques of the present invention may be executed as executable instructions in any form and in any processor suitable for practicing the operations of the present invention as described herein.

As discussed above with respect to natural atmospheric lighting phenomena 360, realistic simulation of skies 315 and atmospheres 310 relies on an approximation of the atmospheric light scattering phenomenon: Rayleigh scattering and Mie scattering. The techniques of the present invention approximates the most common visible effects of each of these types of scattering in a typical atmosphere 310, while allowing sufficient flexibility to go beyond the limitations of the scattering models. Furthermore, the approximations are very quick to compute to provide real-time rendering of multiple frames of a scene 300, such as the continuous rendering of a series of frames of a scene 300 for a simulation. In the discussion of the techniques of the present invention below, reference to an object or viewing object may be made. An object may be any element of the scene 300 represented by the image 215 in which the techniques of the present invention are desired to be applied.

Outscattering and in scattering phenomenon of atmospheric light scattering are approximated and calculated as an attenuation factor and an additive term, respectively. The attenuation factor provides an approximation of light from an object being scattered out of the viewing direction of a viewer 350 by atmosphere particles 330. The additive term provides an approximation of the atmospheric particles 330 scattering light into the viewing direction of the viewer 350. As will be discussed further below, the attenuation factor and additive term are used to modify the apparent color and brightness of any object in the scene 300.

Figure 6:
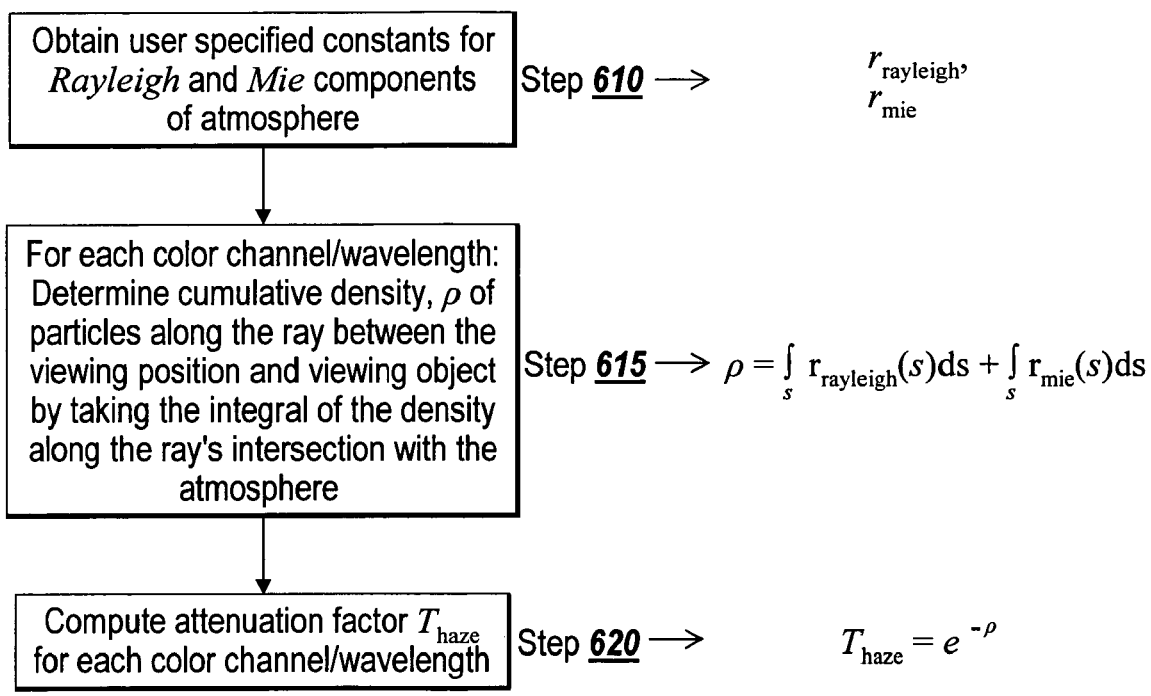
FIG. 6 is a flow diagram depicting steps performed in an illustrative method of a technique of the present invention for determining out scattering natural atmospheric lighting phenomenon.

FIG. 6 depicts an illustrative method 600 and a technique of the present invention to determine an approximation 605 of the scattering attenuation factor. The scattering attenuation factor approximation 605 is derived from a cumulative density, $\rho$, of particles along the beam or ray of light between the object and the viewer 350. The cumulative density is proportional to the length of the ray's intersection with the atmosphere 310, but in general the cumulative density is the integral of the density along the ray's intersection with the atmosphere 310. Density is proportional to the sum of two specified constants for Rayleigh and Mie components of the atmosphere 310.

At step 610 of the illustrative method, the constants for the Rayleigh component, $r_{rayleigh}$, and the Mie components, $r_{mie}$, for the scattering attenuation factor approximation 605 are obtained. In the simulation environment 120 of the present invention, an RGB value is specified for the Rayleigh and Mie components of the atmosphere 310. These constant values may be specified by a user via the configuration mechanism 250 of the simulation environment 120 or may be provided as default, suggested or recommended values in the simulation environment 120. In other embodiments, these constants may be set programmatically via any suitable programming means, such as an application programming interface (API). In accordance with one embodiment of the present invention, density is weighted differently according to the wavelength of light to simulate the effects of Rayleigh scattering. In another embodiment, weights for the Rayleigh and Mie component may be equal. For realistic results, the weights for Rayleigh scattering are highly biased towards blue, and green to a lesser extent.

At illustrative step 615, the cumulative density ρ for each color channel or wavelength is determined:

$$\rho = \int_s r_{rayleigh}(s)ds + \int_s r_{mie}(s)ds$$

In the scattering attenuation approximation 605 of the present invention, each integral is a user specified density multiplied by the length of the portion of the ray that travels through the atmosphere 310. However, more complex density functions can be used.

At step 620 of the illustrative method 600, the final attenuation factor, defined as the proportion of light from an object that reaches the viewer directly, is computed as:

$$T_{haze} = e^{-\rho}$$

This value is computed for multiple wavelengths, or for each of the RGB channels, with different values of ρ for each wavelength.

Figure 7:
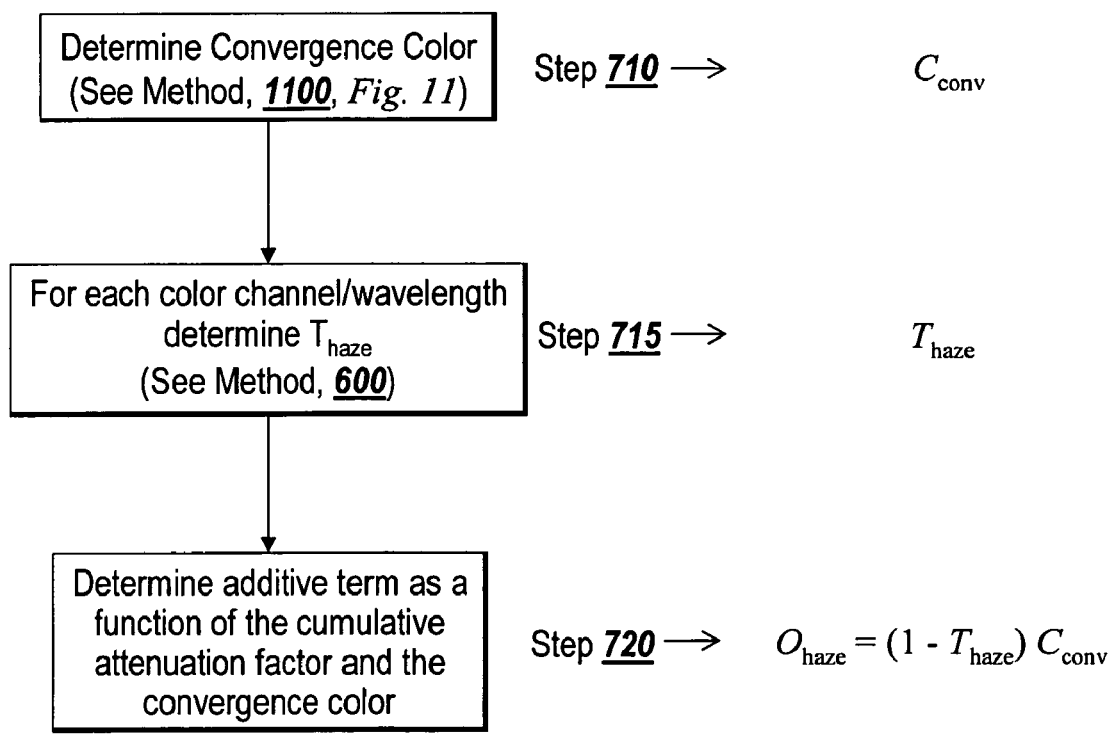
FIG. 7 is a flow diagram depicting steps performed in an illustrative method of a technique of the present invention for determining in scattering natural atmospheric lighting phenomenon.

FIG. 7 depicts an illustrative method 700 for a technique of the present invention to determine an approximation for the additive term 705. As with the attenuation factor approximation 605, the additive term 705 is derived from a cumulative density, ρ, of particles along the ray between the object and the viewer 350. When considering the additive effects of the atmosphere 310 in the distance, the color of the atmosphere 310 itself must be attenuated by atmosphere 310 that is closer to the viewer. This results in the atmosphere 310 converging on a particular color and brightness at which the additive effect of any small sample of atmosphere 310 is in equilibrium with its attenuation factor 605. The atmosphere 310 tends towards this convergence color, $C_{conv}$, when ρ is large. In an exemplary embodiment, it is convenient to treat this convergence color as the horizon color and to specify it directly. As will be discussed in conjunction with the convergence color approximations of the method 1100 of FIG. 11, the techniques of the present parameterize the approximation calculations for specifying the horizon color.

At step 710 of the illustrative method 700 of the present invention, the convergence color, $C_{conv}$, is determined. The details of step 710 are depicted in the illustrated method 1100 of FIG. 11 in association with illustrative methods 900 and 1000 of FIGS. 9 and 10, respectively. At step 715, the attenuation factor 605 $T_{haze}$ is obtained (see method 600 of FIG. 6) for each RGB color channel and/or wavelength. At step 720, the additive term 705, $O_{haze}$, of the present invention is determined as a function of the attenuation factor 605 $T_{haze}$ and the convergence color, $C_{conv}$:

$$O_{haze} = (1 - T_{haze})C_{conv}$$

The convergence color, $C_{conv}$, is based on the user's chosen horizon colors for the Rayleigh and Mie components, $r_{rayleigh}$ and $r_{mie}$. However, it is also dependent on the lighting conditions and the viewing angle with respect to the direction of incident sunlight as described in detail below.

Figure 8:
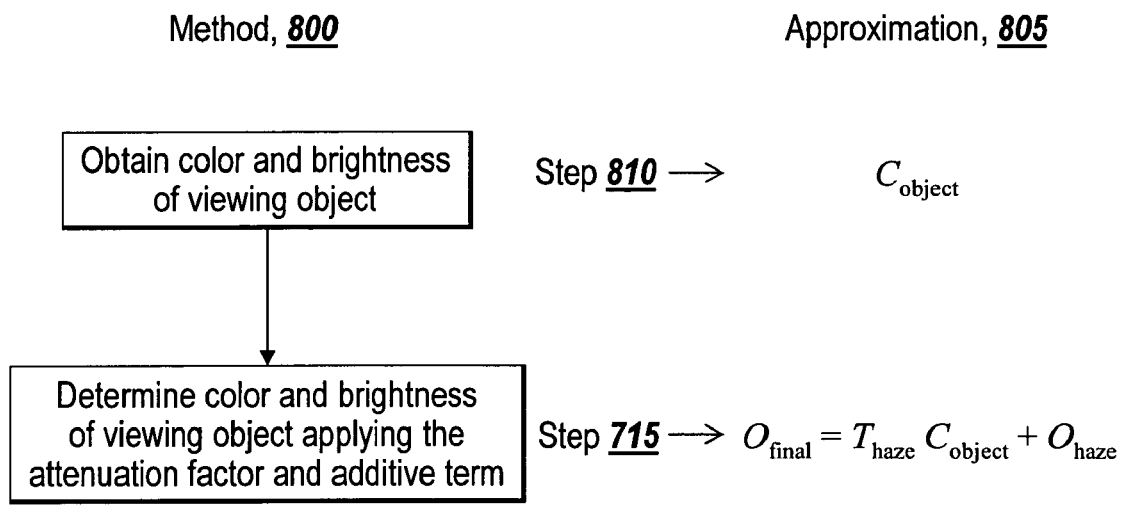
FIG. 8 is a flow diagram depicting steps performed in an illustrative method of a technique of the present invention for determining a composite of in and out scattering natural atmospheric lighting phenomenon.

FIG. 8 depicts an illustrative method 800 for a technique of the present invention to determine a composite approximation 805 of the attenuation factor 605 and the additive term 705. The composite approximation 805 is used to modify the color of any object. At step 810, the current color of the viewing object, $C_{object}$, is obtained. At step 815, the present invention determines the color of the viewing object based on the atmospheric light scattering by applying the attenuation factor 605 and the additive term 705 as follows:

$$O_{final} = T_{haze}C_{object} + O_{haze}$$

In one embodiment, for determining the color of the sky, the viewing object comprises a black background.

In the techniques of the present invention illustrated by methods 600, 700 and 800, the determination and value of $T_{haze}$ is wavelength dependent. As such, these techniques provides for more realistic colors of objects and results in richer hue variations than with other methods, such as alpha blend operations known by one ordinarily skilled in the art.

In another aspect, the techniques of the present invention provide for colors of the effects of illumination upon the atmosphere 310. The techniques of the present invention consider at least two types of light source: sunlight and ambient (sky). Although ambient light affects the Rayleigh and Mie components of the atmosphere 310 equally, sunlight does not. The techniques described herein consider the convergence color of the Rayleigh and Mie components to form a weighted composition of the components using the relative densities of each.

Figure 9:
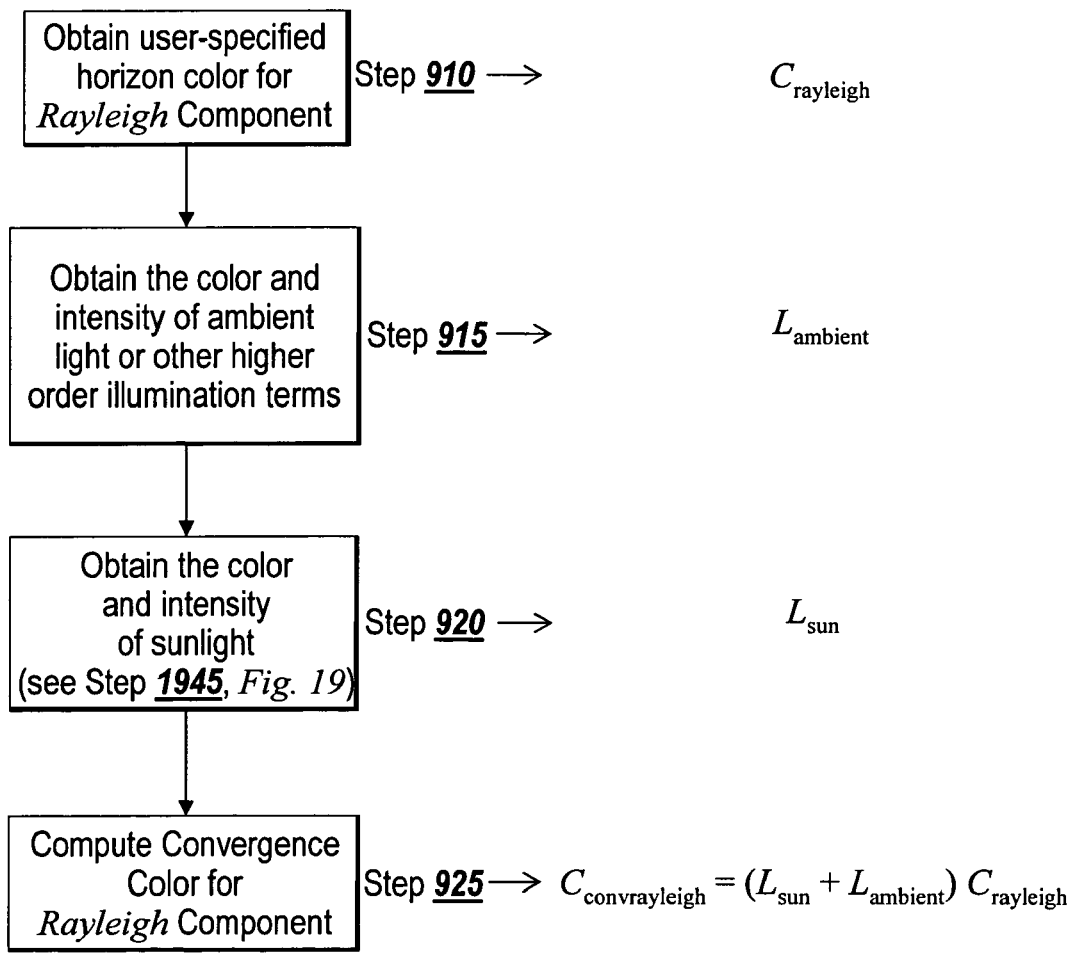
FIG. 9 is a flow diagram depicting steps performed in an illustrative method of a technique of the present invention for determining a Rayleigh convergence color.

FIG. 9 depicts an illustrative method 900 of the present invention for determining a Rayleigh convergence color approximation 905. In an exemplary embodiment, Rayleigh scattering is assumed to scatter light equally in all directions. It is desired that optically dense Rayleigh material converge on a specified horizon color multiplied by the sum of sunlight intensity and ambient intensity.

At step 910 of the illustrative method 900, the horizon color $C_{Rayleigh}$ for the Rayleigh component is obtained. The Rayleigh horizon color may be specified by any suitable means and/or mechanisms, such as by a user via the configuration mechanism 250 of the simulation environment 120. In some embodiments, $C_{Rayleigh}$ comprises a blue-grey color. Furthermore, $C_{Rayleigh}$ should not be confused with Rayleigh density. At step 915, the color and intensity of ambient light, $L_{ambient}$, or other higher order illumination terms is obtained. The $L_{ambient}$ term may be considered a constant for any particular scene 300. As such, the $L_{ambient}$ term may be user specified via the simulation environment 120, or otherwise be set by any mechanism or means to provide a value suitable for representing the ambient component of light in the scene 300. At step 920, the color and intensity of sunlight, $L_{sun}$, is obtained (see step 1945 of FIG. 19 for details). At step 925 the convergence color for the Rayleigh component of illumination of the atmosphere 310, e.g., the convergence color of a purely Rayleigh atmosphere, is calculated as:

$$C_{convrayleigh}=(L_{sun}+L_{ambient})C_{rayleigh}$$

As such, the parameter $C_{convrayleigh}$ comprises the composite effects from sun and ambient light.

Figure 10:
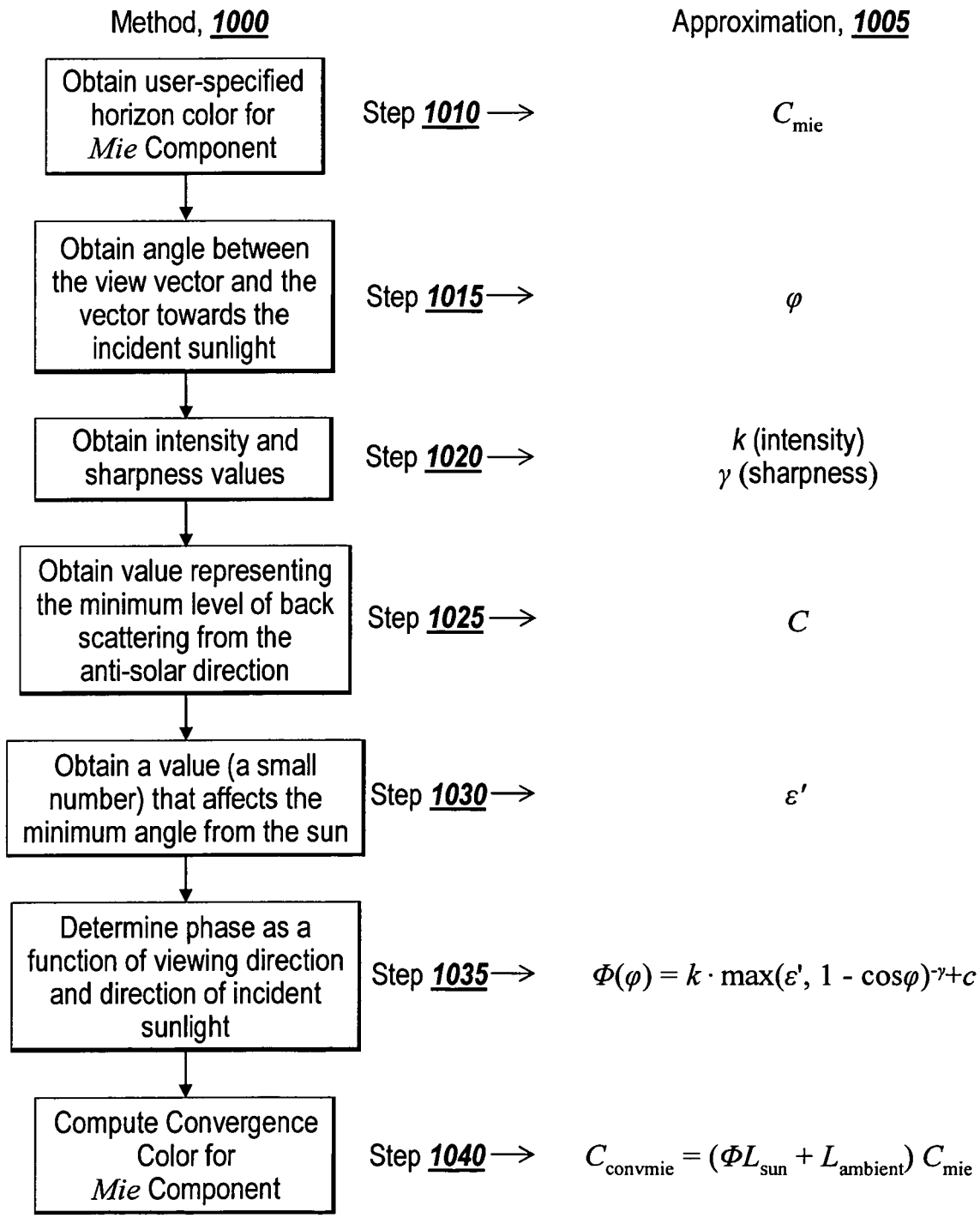
FIG. 10 is a flow diagram depicting steps performed in an illustrative method of a technique of the present invention for determining a Mie convergence color.

FIG. 10 depicts an illustrative method 1000 of the present invention for determining a Mie convergence color approximation 1005. In an exemplary embodiment, Mie scattering is assumed to be strongly forward scattering and results in a bright glow around the sun 320. As such, a phase function is used to determine the effects of incident sunlight on an object. It is desired that optically dense Mie atmospheric particles 330 material to converge on a specified horizon color multiplied by the sum of the in-scattered sunlight intensity and ambient intensity.

At step 1010 of the illustrative method 1000 of the present invention, the horizon color $C_{Mie}$ for the Mie component is obtained. The Mie horizon color may be specified by any suitable means or mechanisms, such as by a user via the configuration mechanism 250 of the simulation environment 120. At step 1015, the angle φ, or phase angle, between the viewer 350 and the sunlight as viewed from the object is determined and/or obtained. The angle φ may be determined from a vector from the viewing position 352 and/or viewer 350 towards the sun 320 or incident sunlight in the scene 300.

At illustrative step 1020 of the present invention, intensity and sharpness values, κ and γ, are obtained. The intensity and sharpness value are adjustable values to control the intensity and sharpness of the "glow" around the sun 320 or the apparent sun of the scene 300. In some embodiments, these may be positive values that can be specified by a user via any suitable means or mechanisms, such as by the configuration mechanism 250 of the simulation environment 120. At step 1025, a value, c, is obtained to represent a minimum level of back scattering from an anti-solar direction. At step 1030, a value, ε, is obtained that affects the minimum angle from the sun. In some embodiments, ε is a small number.

At step 1035 of the illustrative method 1000 of the present invention, phase Φ is determined as a function of the viewing direction and the direction of incident sunlight as follows:

$$\Phi(\phi)=k\cdot\max(\varepsilon, 1-\cos\phi)^{-\gamma}+c$$

At step 1040, the convergence color $C_{convmie}$ of a purely Mie atmosphere is calculated as:

$$C_{convmie}=(\Phi L_{sun}+L_{ambient})C_{mie}$$

In accordance with this technique, the phase function is relatively quick to compute while appearing to give realistic and desirable results.

Figure 11:
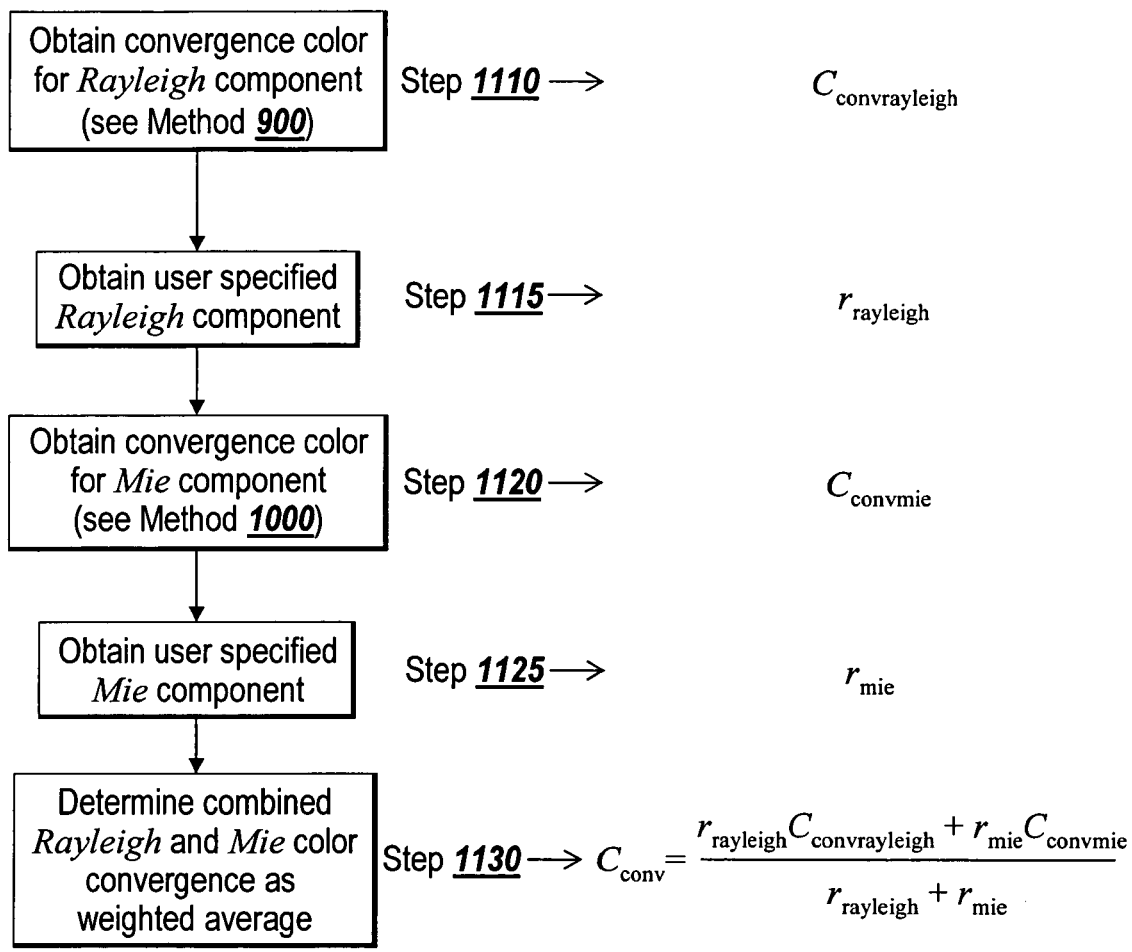
FIG. 11 is a flow diagram depicting steps performed in an illustrative method of a technique of the present invention for determining a composite of Rayleigh and Mie convergence colors.

FIG. 11 depicts an illustrative method 1100 for a technique of the present invention to determine atmosphere lighting from a weighted average combination of the Rayleigh convergence color approximation 905 and Mie convergence color approximation 1005. At step 1110, the Rayleigh convergence color 905, $C_{convrayleigh}$, is obtained (see method 900 of FIG. 9), Likewise at step 1120, Mie convergence color 1005, $C_{convmie}$, is obtained (see method 1000 of FIG. 10). At step 1115, the Rayleigh component, $r_{rayleigh}$, of the atmosphere 310 is obtained, and at step 1125, the Mie component, $r_{mie}$, is likewise obtained. The $r_{rayleigh}$ and $r_{mie}$ parameters may be user specified RGB color values configured or otherwise specified by a user via the simulation environment 120. At step 1130, the combined atmosphere color convergence is determined as a weighted average of $C_{convrayleigh}$ and $C_{convmie}$, according to the relative densities of the Rayleigh and Mie components:

$$C_{conv}=(r_{rayleigh}C_{convrayleigh}+r_{mie}C_{convmie})/(r_{rayleigh}+r_{mie})$$

As discussed above in conjunction with FIG. 7, the atmosphere convergence color $C_{conv}$ is used in determining the additive term approximation 705 in accordance with the operations of the present invention. As is depicted by the techniques of the illustrative methods 900, 1000, and 1100, the atmosphere convergence color $C_{conv}$ may be based on user specified horizon colors for the Rayleigh and Mie components, $C_{rayleigh}$ and $C_{mie}$.

In another aspect, the techniques of the present invention are directed towards the visually realistic appearance and real-time rendering of clouds 325 in a scene 300. In accordance with the cloud related techniques of the present invention, cloud appearance is primarily driven by a cloud density function discussed below. In an exemplary embodiment, the cloud density function is implemented as a pixel/fragment shader 230. The cloud appearance technique uses multiple tile-able cloud textures with independent scaling and weightings. This approach has multiples benefits including the following: 1) large cloud formations can be created with fine details and without the need for large, detailed textures; 2) distinct cloud patterns can be controlled at individual scales, and 3) sophisticated looking time-lapse effects are possible by scrolling individual textures.

Figure 12:
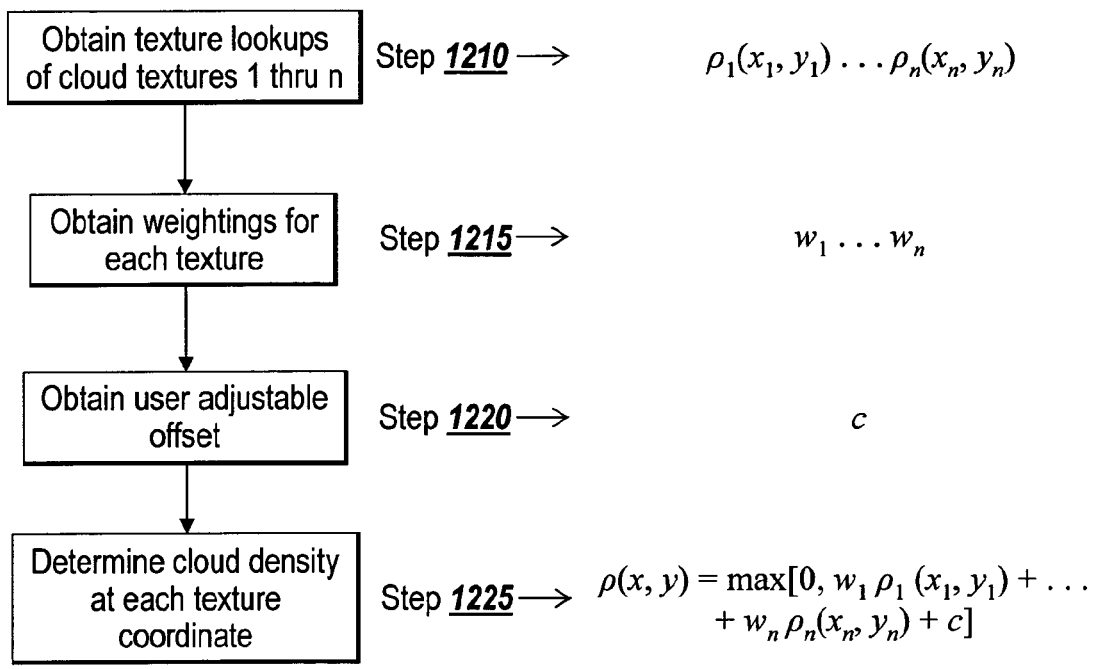
FIG. 12 is a flow diagram depicting steps performed in an illustrative method of a technique of the present invention for providing a cloud density function.

FIG. 12 depicts an illustrative method 1200 of the present invention for determining a cloud density function 1205. At step 1210, texture lookup values are obtained for cloud textures 1 through N that may used to represent a cloud 325 formation. At step 1215, the weightings $w_1$ through $w_n$ for each texture 1 ... N is obtained. The texture lookups $\rho_1(x_1,y_1)$ through $\rho_n(x_n,y_n)$ and weightings $w_1 ... w_n$ for cloud textures 1 through N can be obtained by any suitable mechanism or means via the simulation environment 120. In one embodiment, these texture lookups and/or weightings may be stored in memory and/or storage of the computing device 102 of the simulation environment 120. For example, texture lookups and/or weighting values may be in any type of data structure implemented in the simulation environment 120 or in any form of database or file accessible by the simulation environment 120.

At illustrative step 1220, a cloud density adjustable offset, c, is obtained. The cloud density adjustable offset may be user specified via the configuration mechanism 250 of the simulation environment 120. In other embodiments, the offset c may be programmatically set or otherwise be specified by the simulation environment 120. By changing the cloud density adjustable offset, while restricting the resulting ρ to non-negative values, the proportion of cloud-filled sky relative (ρ>0) to clear sky (ρ=0) can be adjusted interactively. In an exemplary embodiment, the offset is the sum of the adjustable offset, c, and a compensation term calculated by the simulation environment 120 of the present invention as described in conjunction with FIG. 13. At each texture coordinate of a cloud 325, the cloud density is determined and calculated at step 1125 of illustrative method 1200 as follows:

$$\rho(x,y)=\max[0, w_1\rho_1(x_1,y_1)+ \ldots +w_n\rho_n(x_n,y_n)+c]$$

Figure 13:
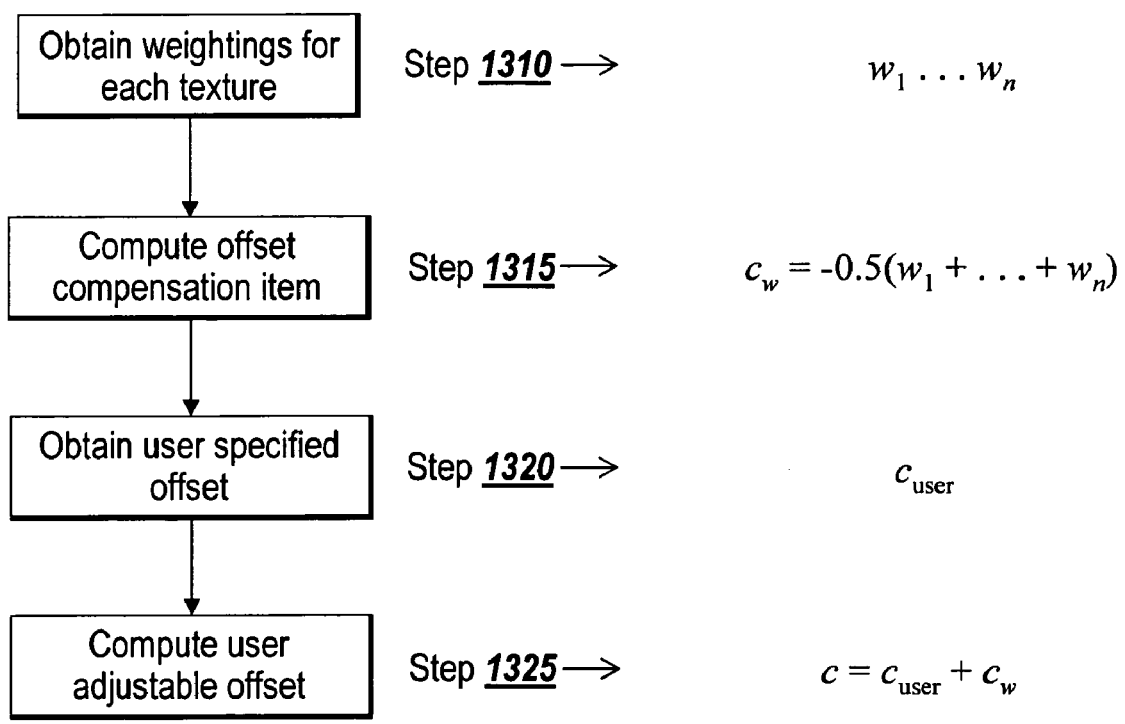
FIG. 13 is a flow diagram depicting steps performed in an illustrative method of a technique of the present invention for providing a compensation offset term for the cloud density function.

FIG. 13 depicts an illustrative method 1300 of the present invention for providing a compensation term for the offset used in the cloud density function 1205 of illustrative method 1200. By using a cloud density offset, c, calculated with the compensation offset term 1305 of illustrative method 1300, the proportion of cloud-filled sky 315 relative to clear sky 315 is approximately independent of weightings $w_1 \ldots w_n$ if each cloud texture, $\rho_1(x_1,y_1) \ldots \rho_n(x_n,y_n)$, comprises a certain set of values greater than 0.5 and a comparable amount of values less than 0.5

At step 1310 of the present invention, the illustrative method 1300 obtains weightings $w_1 \ldots w_n$ for each texture. At step 1215, the offset compensation term $C_w$ is calculated as follows:

$$C_w = -0.5(w_1 + \ldots + w_n).$$

In an exemplary embodiment, a constant value of –0.5 is used to determine the offset compensation term $C_w$. In other embodiments, other constant values may be suitable to use or may be used to provide a desired offset. At step 1320, a specified adjustable offset $C_{user}$ is obtained, such as user specified offset. The offset $C_{user}$ may be specified by any suitable mechanism or means, such as by a user via the configuration mechanism 250 of the simulation environment 120. At step 1325, a user adjusted and compensated offset, C, is determined by adding the user specified offset $C_{user}$ with the offset compensation term $C_w$. In one embodiment, the value of $C_{user}$ is used in the cloud density function 1205 at steps 1220 and 1125 of illustrative method 1200.

Figure 14:
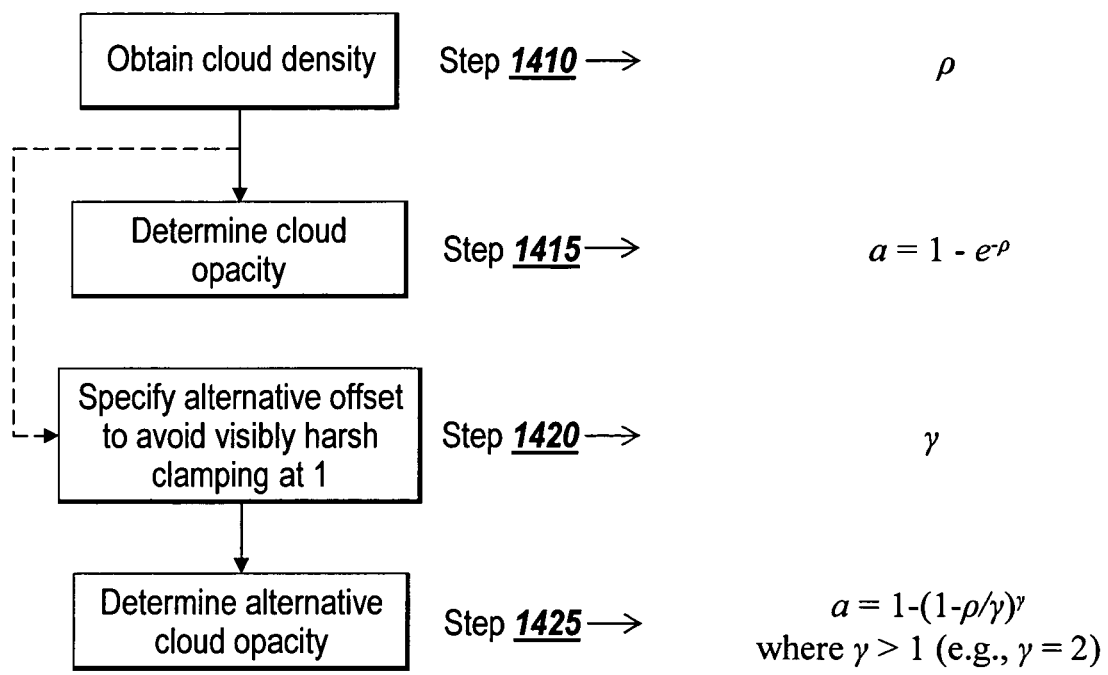
FIG. 14 is a flow diagram depicting steps performed in an illustrative method of a technique of the present invention for determining cloud opacity.

In one aspect of the present invention, the cloud density function 1205 is used to determine the opacity, $\alpha$, of a cloud 325, as depicted by the illustrative method 1400 of FIG. 14. Cloud opacity is used to indicate how much light passes through the cloud object's pixels. At step 1410 of illustrative method 1400, the density $\rho$ of a cloud 325 is obtained. In one embodiment, at step 1415, the opacity of the cloud 325 may in one embodiment be calculated as:

$$\alpha = 1 - e^{-\rho}$$

The cloud density $\rho$ is physically based in that it is interpreted as an accurate model of the physical particles and/or a distance through the target medium. As such, the cloud opacity $\alpha$ calculated at step 1415 gives a much more desirable and realistic result than simply clamping $\rho$ to the [0, 1] range.

However, an alternative approach can be use to determine cloud opacity that is quicker to compute and provides similar desirable results as compared to the opacity calculated at step 1415. This approach also avoids visibly undesirable results from a cloud density $\rho$ value clamped at 1. Alternatively, after step 1410, the illustrative method 1400 may perform step 1420 and step 1425 instead of step 1415. At step 1430, a cloud opacity offset $\gamma$ can be provided, specified, by the user and/or the simulation environment 120. In one embodiment, this cloud opacity offset has a value greater than 1, and in an exemplary embodiment, may beset to 2 for quick execution. At step 1425, the following cloud opacity a calculation is performed:

$$\alpha = 1 - (1 - \rho/\gamma)^\gamma$$

In another aspect, the cloud related techniques of the present invention provides for the lighting of clouds. Cloud lighting is a color value, such as an RBG color code, that is multiplied by a current cloud color to give the cloud 325 a final color for rendering. In an exemplary embodiment, cloud lighting calculations consider both sunlight and ambient terms. In some embodiments, the ambient term is considered to be constant throughout the scene 300 on any particular frame. However, in other embodiments any suitable and adjustable offset or calculations may be used to represent the ambient term for cloud lighting. With respect to the sunlight term of cloud lighting, the sunlight term is related to the color and intensity of sunlight reaching the top of the cloud layer, self-shadowing effects of the cloud 325, and light scattering within the cloud 325.

Figure 15:
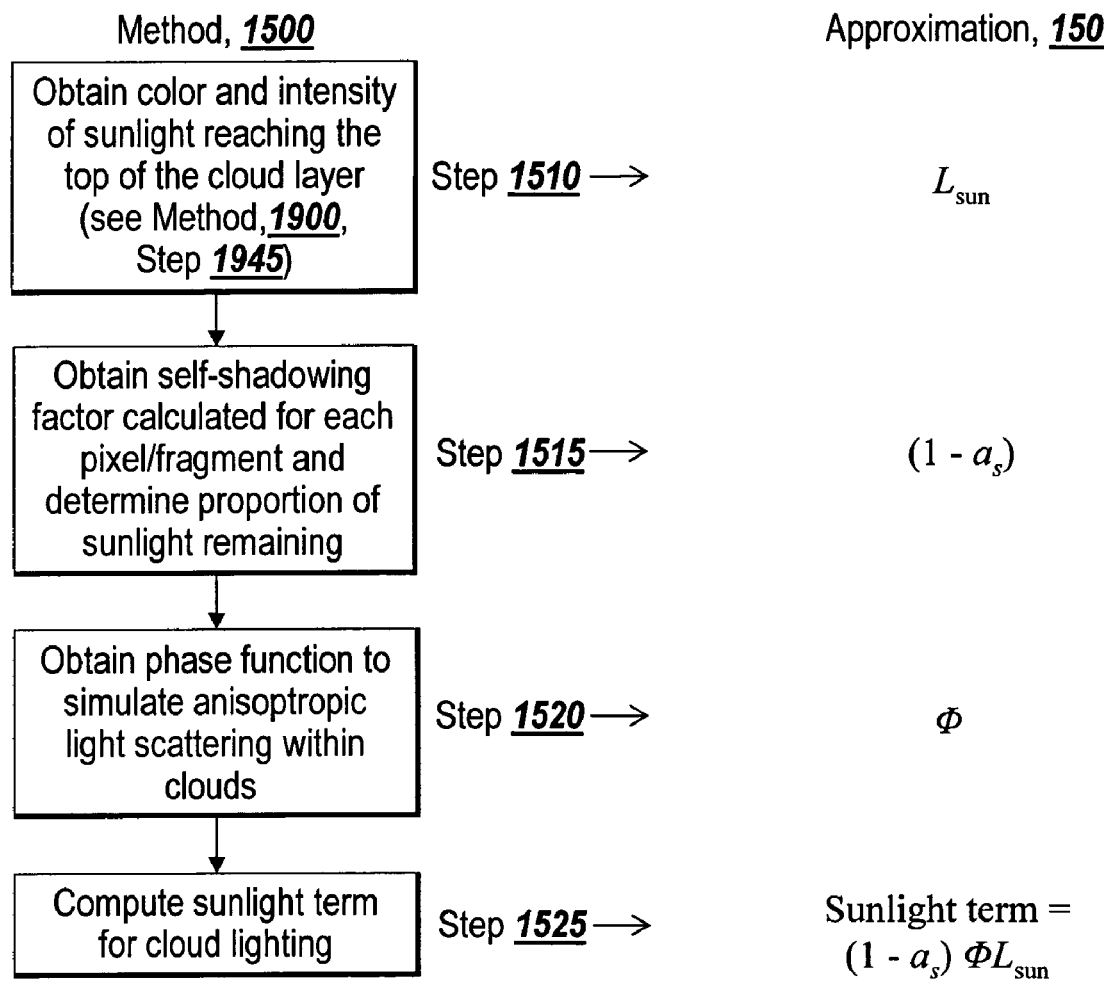
FIG. 15 is a flow diagram depicting steps performed in an illustrative method of a technique of the present invention for determining a sunlight term for cloud lighting.

FIG. 15 depicts an illustrative method 1500 of a technique of the present invention for determining the sunlight term 1505 for cloud lighting. At step 1510, a color and intensity value, $L_{sun}$, representing sunlight reaching the top layer of the cloud 325 is obtained (see illustrative method 1900, e.g., step 1945 of FIG. 1900). In an exemplary embodiment, $L_{sun}$ is calculated in a vertex shader 235. At step 1515, a self-shadowing factor, as, is calculated for each pixel/fragment. The self-shadowing factor is also referred to as shadow opacity and it is determined as discussed below in illustrative method 1700 of FIG. 17. At Step 1515, the illustrative method 1500 determines the proportion of sunlight remaining after self-shadowing by the following calculation:

$$(1 - a_s)$$

At step 1520, a phase function $\Phi$ is determined to simulate anisotropic light scattering within the clouds. In an exemplary embodiment, the phase function is calculated in the vertex shader 235 for speed. In one embodiment, the phase function $\Phi$ is the same phase function calculation used for determining the Mie component of the atmosphere 310 as described by the illustrative method 1000 of FIG. 10 (see step 1035). In this case, the phase function $\Phi$ is calculated with a phase angle $\phi$ as viewed from the cloud 325. At step 1525, the sunlight term 1505 for cloud lighting is determined and calculated:

$$\text{Sunlight term} = (1 - a_s)\Phi L_{sun}$$

Figure 16A:
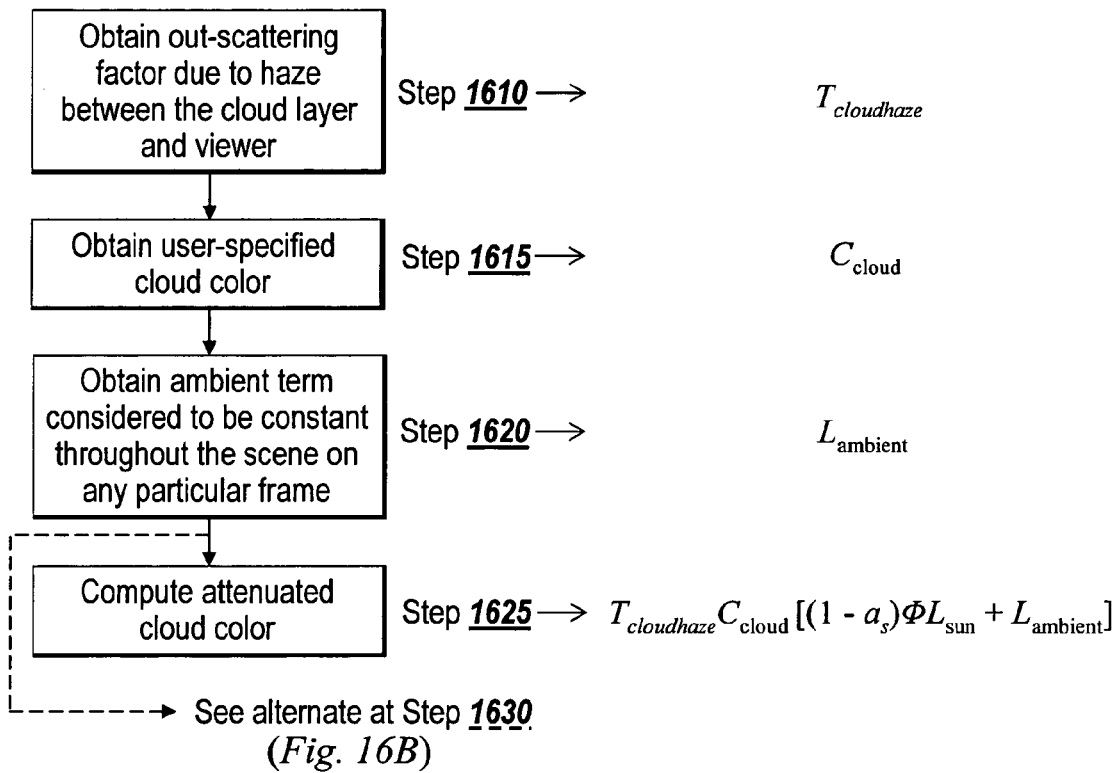
FIG. 16A is a flow diagram depicting steps performed in an illustrative method of a technique of the present invention for determining an attenuated cloud color.

FIG. 16A depicts an illustrative method 1600 of the present invention for determining the attenuated cloud color approximation 1605. Before the cloud color is passed to the pixel/fragment shader 230, the cloud color is attenuated by an out scattering factor, $T_{cloudhaze}$, due to haze between the cloud 325 and the viewer 350, which is computed in the vertex program 335. $T_{cloudhaze}$ is described below in conjunction with illustrative methods 1600 and 1800 of FIGS. 16A, 16b and 18. At step 1610, the out scattering factor $T_{cloudhaze}$ is calculated or otherwise obtained to represent the out scattering due to haze between the cloud 325 layer and the viewer 350. At step 1615, a specified cloud color $C_{cloud}$ is obtained or otherwise provided. For example, the cloud color $C_{cloud}$ may be user specified, such as via the configuration mechanism 250 of the simulation environment 120. At step 1620, the ambient term of cloud color, $L_{ambient}$, is obtained for calculating the attenuated cloud color. As previously discussed, the ambient term is considered to be constant through out the scene 300 of any particular frame. In one embodiment of the illustrative method 1600, the attenuated cloud color 1605 is calculated per pixel/fragment as:

$$T_{cloudhaze} C_{cloud}[(1-\alpha_s)\Phi L_{sun} + L_{ambient}]$$

Figure 16B:
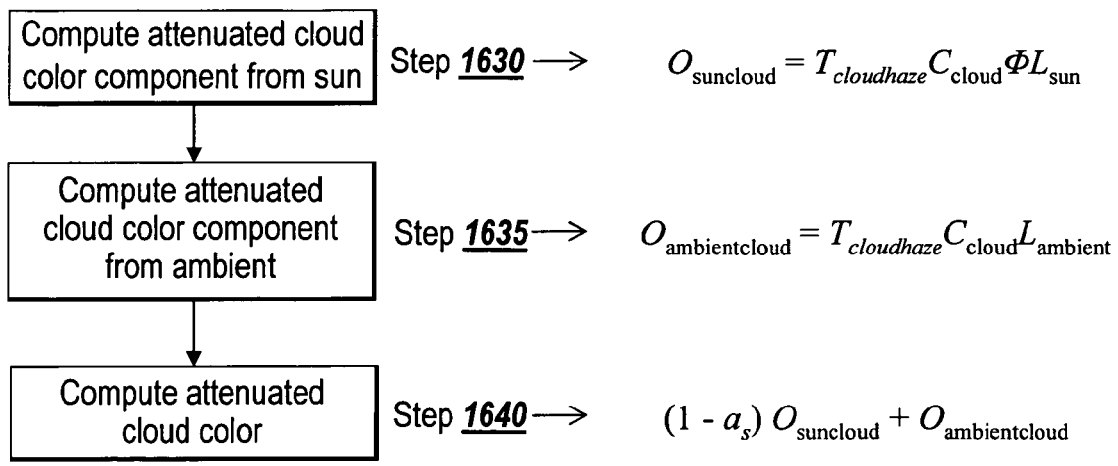
FIG. 16B is a flow diagram depicting steps performed in another illustrative method of an alternative technique of the present invention for determining an attenuated cloud color.

However, to save computation in the pixel/fragment shader 230, an alternative method may be used as illustrated in FIG. 16B.

Instead of performing step 1625 of illustrative method 1600, in an alternative embodiment, steps 1630, 1635 and 1640 as illustrated in FIG. 16B are performed. At step 1630, the illustrative method 1600 computes the attenuated cloud color component $O_{suncloud}$ for the sun term by the following calculation:

$$O_{suncloud} = T_{cloudhaze} C_{cloud} \Phi L_{sun}$$

At step 1635, the attenuated cloud color component $O_{ambientcloud}$ for the ambient term is computed as follows:

$$O_{ambientcloud} = T_{cloudhaze} C_{cloud} L_{ambient}$$

In an exemplary embodiment, the $O_{suncloud}$ and $O_{ambientcloud}$ computations are performed in a vertex shader 235 prior to computing the final composite attenuated cloud color 1605 in the pixel/fragment shader 230 by the following calculation:

$$(1-\alpha_s) O_{suncloud} + O_{ambientcloud}$$

As such, the alternative expression of the attenuated cloud color comprises an approach wherein the attenuated cloud color components for the sunlight and ambient terms are computed separately in the vertex shader 235.

In another aspect, the techniques of the present invention consider the self-shadowing of clouds in the realistic simulation and real-time rendering of an outdoor scene 300 with clouds 325. In some embodiments, self shadowing is based on the integral of densities within the cloud 325 along a path towards the light source, such as the sun 325. In an exemplary embodiment as depicted in FIG. 17, the illustrative method 1700, at step 1710, computes a single sample, σ, of the cloud density function at the current cloud coordinates offset by a small vector in the direction towards the light source. The single sample is performed for computational speed. However, in other embodiments, more than a single sample of the cloud density function may be used and accomplish the desired computational speed. At step 1715, the sampled cloud density σ is weighted by an obtained or otherwise provided constant κ. Then, at step 1720 of the illustrative method 1700, the self-shadowing opacity 1705, $a_s$, is calculated by either one of the following expressions:

$$a_s = 1 - e^{-k\sigma}$$

or $$a_s = 1 - (1 - k\sigma/\gamma)^\gamma$$

The above self-shadowing opacity 1705 calculations are similar to the illustrative method 1400 of FIG. 14, wherein the value for γ is greater than 1, and, in some embodiments, may be set to 2 for computational speed.

Figure 18:
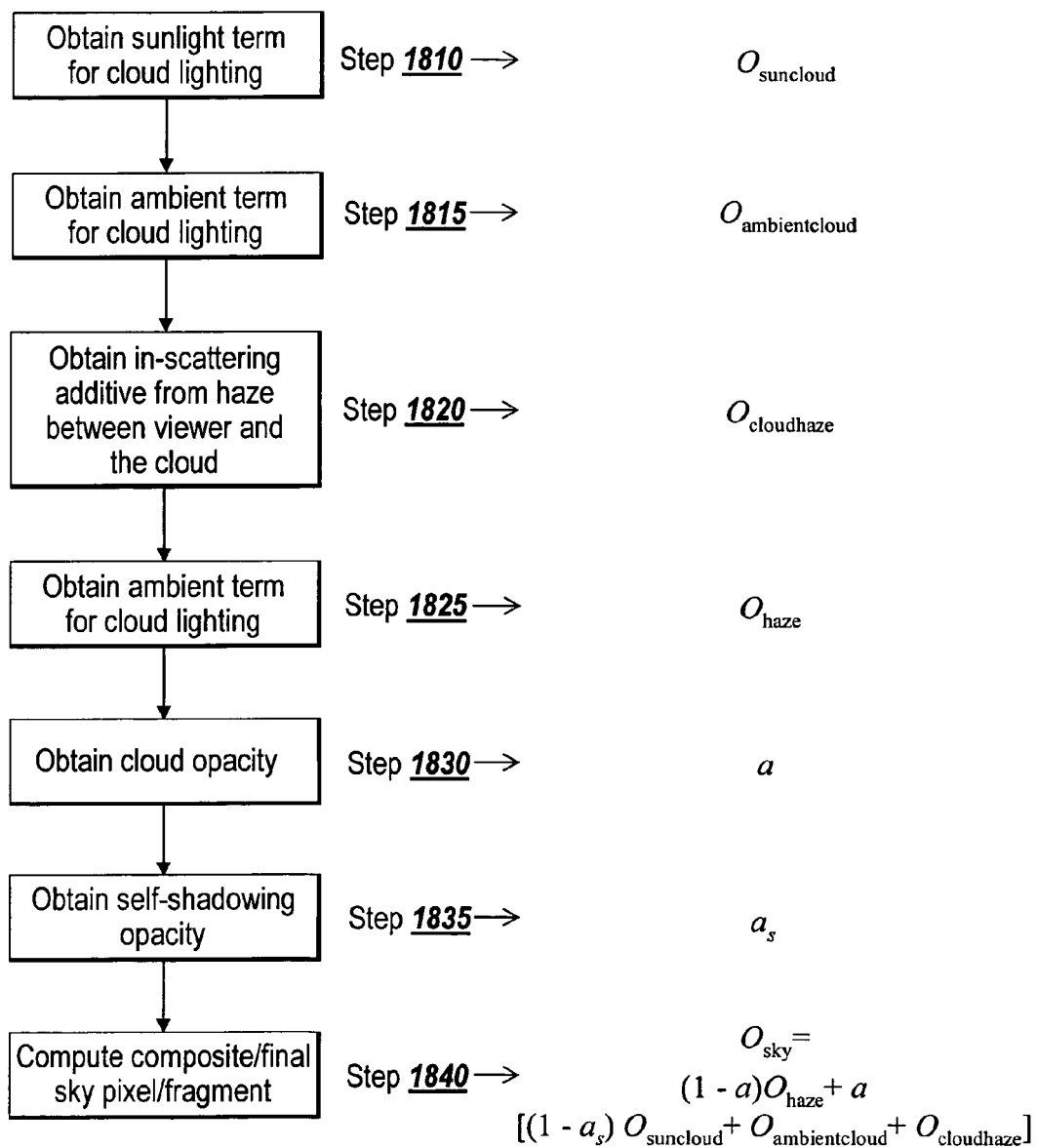
FIG. 18 is a flow diagram depicting steps performed in an illustrative method of a technique of the present invention for determining sky color.

In a further aspect, the final color of a pixel/fragment for the sky 315 can be determined from a composition of the cloud opacity values related to the sun and ambient terms of the cloud coloring along with terms for the cloudless sky and haze. FIG. 18 depicts an illustrative method 1800 for a technique of the present invention to determine the sky color approximation 1805. The sunlight term for cloud lighting $O_{suncloud}$ as calculated in illustrative method 1500 of FIG. 15 is obtained at step 1810, and the ambient term for cloud lighting $O_{ambientcloud}$ as calculated in illustrative method 1600 of FIGS. 16A and 16B is obtained at step 1815.

At step 1820 of the illustrative method 1800, the in scattering additive term $O_{cloudhaze}$ is calculated or otherwise provided to represent an approximation of the haze between the viewer 350 and the cloud 325. At step 1825, the additive term for atmospheric in scattering $O_{haze}$ as calculated in illustrative method 1700 of FIG. 7 is obtained. At steps 1830 and 1835, the cloud opacity α and self-shadowing opacity $a_s$ are provided as discussed in illustrative methods 1400 and 1700 respectively. Using all the natural atmospheric lighting phenomena related approximations determined, calculated, or otherwise provided in steps 1810 though step 1835, the final sky color 1805 can be determined at step 1840 as follows:

$$O_{sky} = (1-\alpha) O_{haze} + \alpha((1-as) O_{suncloud} + O_{ambientcloud} + O_{cloudhaze}).$$

The calculation at step 1840 is an alpha blend type operation which composites the cloud over the cloudless sky, $O_{haze}$, which in an exemplary embodiments was computed in the vertex shader 235. The term $O_{cloudhaze}$ accounts for the additive (in-scattering) contribution of haze that is between the viewer 350 and the cloud 325. As such, $O_{cloudhaze}$ contributes to the visual realistic simulation of the appearance of clouds. In an exemplary embodiment, $O_{cloudhaze}$ is computed in the vertex shader 325 along with $T_{cloudhaze}$.

As used in the illustrative methods 1600 and 1800 as discussed above, $T_{cloudhaze}$ and $O_{cloudhaze}$ are specific values for $T_{haze}$ and $O_{haze}$, respectively. The technique for calculating $T_{haze}$ is discussed above in conjunction of illustrative method 600 of FIG. 6. Likewise, the technique for calculating $O_{haze}$ is discussed in relation to illustrative method 700 of FIG. 7. $T_{cloudhaze}$ is the value of $T_{haze}$ computed using the illustrative method 600 for the ray or beam of light between the viewer 350 and the cloud 325 being considered. $O_{cloudhaze}$ is the value of $O_{haze}$ computed using the illustrated method 700 for the light ray between the viewer 350 and the cloud 326 being considered. In this case, the atmosphere convergence color $C_{conv}$ relies on the sunlight attenuation parameters $L_{sun}$ and $p(\theta, \theta_{sunlight})$ to derive the sunlight intensity at an appropriate point along the ray. For this, the midpoint between the viewer 350 and the cloud 325 is chosen. The sunlight attenuation parameters are discussed below in conjunction with FIGS. 19 and 20

In one embodiment, the present invention is related to techniques for the realistic simulation of shadows cast by clouds 325 onto other objects such as the terrain 305. The proportion of sunlight that is interrupted by a cloud 325 and prevented from reaching a certain point in the scene 300 is determined by sampling the cloud density function 1205 at the cloud layer's intersection with the ray from the point towards the sun. The cloud density function 1205 is described in detail above with respect to the illustrative method 1200 of FIG. 12.

In an embodiment of the atmosphere 310 of the scene representing the Earth's atmosphere, the direct sunlight that reaches any point in the atmosphere 310 is dimmer and redder than the sunlight entering the upper atmosphere 310. This natural atmospheric lighting phenomenon is due to the Rayleigh and Mie scattering of light away from the direct path of the beam of light. This effect is most pronounced when the sun is low in the sky 315 because the light takes a longer path through the atmosphere 310. In one embodiment of this natural atmospheric lighting phenomenon, there is a grade of color and intensity with respect to altitude, often with a dramatic hue shift from white to yellow to red. A resulting consequence of this phenomenon is the rich color gradients one sees in the sky 315 at sunrise and sunset. This effect may also be referred to as the "sunrise" or "sunset" effect.

Figure 19:
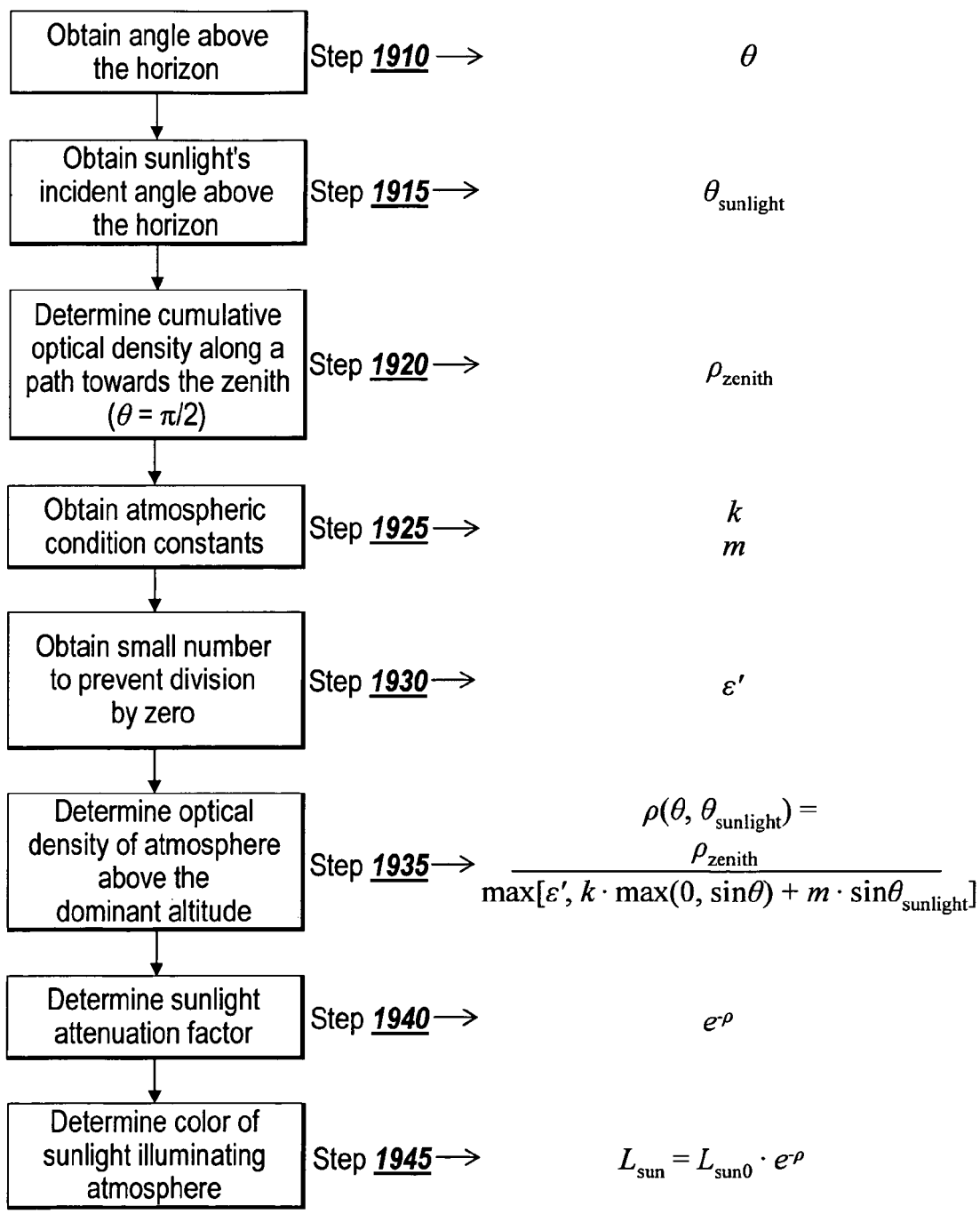
FIG. 19 is a flow diagram depicting steps performed in an illustrative method of a technique of the present invention for determining the optical density of the atmosphere and a sunlight attenuation factor.
Figure 20:
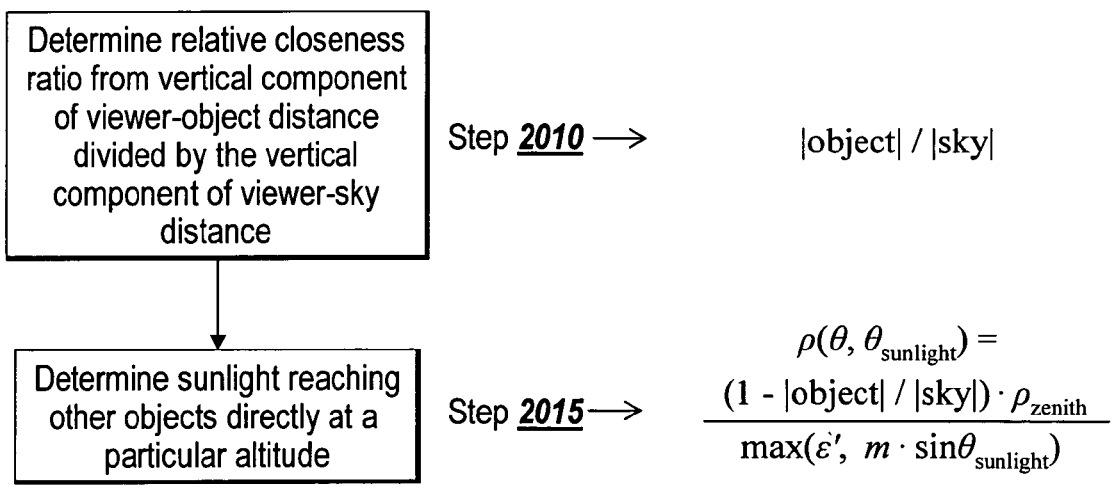
FIG. 20 is a flow diagram depicting steps performed in an illustrative method of a technique of the present invention for determining a sunlight attenuation factor for atmosphere between the viewer and objects nearby.

FIGS. 19 and 20 depict illustrative methods 1900 and 2000 of techniques of the present invention to realistically simulate and render real-time the effects of sunlight attenuation, such as sunrises and sunsets. The techniques of illustrative methods 1900 and 200 are based on the following assumptions with respect to a particular point in the sky 215, as viewed from the ground:

1) Due to the optical density of atmosphere 310, the lower atmosphere partially obscures the upper atmosphere. Therefore, the sunlight reaching the lower atmosphere is visually more important than the sunlight reaching the upper atmosphere.

2) The degree to which the lower atmosphere is visually more important than the upper atmosphere depends on the cumulative optical density of the lower atmosphere, and therefore is dependent on the observed angle above the horizon.

In an exemplary embodiment of the present invention, the visual consequences of the above assumptions for sunlight attenuation are well represented by choosing a single "dominant" point along the path being observed, that receives what is considered or desired to be the dominant color and intensity of sunlight. For observance paths close to the horizon, the chosen point along the path should be of lower altitude than for paths close to the zenith.

FIG. 19 depicts the illustrative method 1900 of the technique of the present invention to simplify the relationship between angle above the horizon and the "dominant altitude" to a relationship between the angle above the horizon, $\theta$, the sunlight's incident angle above the horizon, $\theta_{sunlight}$, and the "optical density of atmosphere above the dominant altitude", $\rho(\theta, \theta_{sunlight})$. At steps 1910 and 1915, the angle above the horizon $\theta$, and the sunlight incident angle above the horizon $\theta_{sunlight}$ are determined. These angles may be calculated by any suitable means or mechanisms based on the physical and mathematical relationships related to the observed path in the scene 300. At step 1920, the cumulative optical density $\rho_{zenith}$ is calculated or otherwise obtained or provided. The value of the $\rho_{zenith}$ parameter is the cumulative optical density along an observance path toward the zenith ($\theta = \pi/2$).

At step 1925, the atmosphere conditions constants, k and m, are obtained or otherwise provided. These constants are in some embodiments set to a value of 1, but can be adjusted to simulate some atmospheric conditions more accurately. In some embodiments, these constants are user specified via the configuration mechanism 250 of the simulation environment 120. At step 1903, the small number value $\acute{\epsilon}$ is obtained and/or provided to be used in the optical density calculation to prevent division by zero in the optical density calculation in the following step 1935.

At step 1935, the optical density of atmosphere above the dominant altitude is calculates as follows:

$$\rho(\theta, \theta_{sunlight}) = \rho_{zenith}/(\max(\acute{\epsilon}, k\cdot\max(0, \sin\theta) + m\cdot\sin\theta_{sunlight})$$

The above calculation provides a value of the optical density $\rho$ that decreases with increasing angles above the horizon (>0) of either the observed point on the sky 315 or the incident sunlight. As both angles $\theta$ and $\theta_{sunlight}$ approach the value of 0, the optical density value produced tends towards infinity.

At step 1940 of the illustrative method 1900, a sunlight attenuation factor is then calculated from $\rho$ as determined at step 1935. In an exemplary embodiment, the sunlight attention factor is calculated as $e^{-\rho}$. Since the cumulative optical density $\rho$ varies with the wavelength of light, the resulting attenuation factor approaches 0 at a rate that depends on the wavelength. Thus, the optical density $\rho$ passes through a range of hues as it tends from white (where $\rho=0$) to black (where $\rho=\infty$). Where optical density $\rho$ is strongly blue or blue-green, for example due to atmospheric Rayleigh light scattering, the attenuation factor exhibits the red and orange hues that are desirable under such conditions. At illustrative step 1945 of the present invention, the final color of sunlight used to illuminate the atmosphere (not including ambient or higher order illumination) is determined using the optical density provided by step 1935:

$$L_{sun} = L_{sun0} \cdot e^{-\rho}$$

In another aspect, the techniques of the present invention consider sunlight attenuation from the atmosphere when the viewer 350 and the object being considered or viewed, such as the terrain 305, are relatively close or nearby. FIG. 20 depicts an illustrative method 2000 of a technique of the present invention for determining the optical density of atmosphere for relatively close viewer 350 and object. At step 2010, a relative closeness ratio is determined from the vertical component of the distance between the viewer 350 and the object divided by the vertical component of the distance between the viewer 350 and the sky 315. In one embodiment, the ratio is expressed as the following:

(|object|/|sky|)

This ratio accounts for the relative closeness of the object and therefore the reduced altitude from which the angle $\theta$ is derived for use in the cumulative optical density $\rho$ calculation. The technique of illustrative method 2000 replaces the term "k·max(0, sin $\theta$)" in the cumulative optical density calculation illustrated at step 1935 of method 1900 with the following term:

(|object|/|sky|)·k·max(0, sin $\theta$)

As such, the cumulative optical density $\rho$ will be calculated for viewers 350 nearby objects to provide a visually realistic and real-time simulation of such conditions.

At step 2015 of the illustrative method 2000, a technique to determine the sunlight reaching other objects directly, such as clouds or terrain of a particular altitude, is depicted. At step 2015, the following variation of the optical density calculation is used:

$$\rho(\theta, \theta_{sunlight}) = ((|object|/|sky|) \cdot k\cdot\max(0, \sin\theta))/(\max(\acute{\epsilon}, m\cdot\sin\theta_{sunlight})$$

As previously discussed, in some embodiments, the |object|/|sky| ratio is the vertical component of the viewer-object distance divided by the vertical component of the apparent viewer-sky distance. This means that for objects in the upper atmosphere $\rho$ is small, while for objects close to the viewer, $\rho$ is similar to that for the lower atmosphere.

In an exemplary embodiment, the techniques of the present invention discussed above are directed towards illustrative methods performed on a frequency of a vertex basis and/or pixel/fragment basis in a vertex shader 235 and/or pixel shader 230. As such, each of the techniques discussed above can be executed for each vertex and/or pixel needed to render the image 215 and thus the scene 300, including any visual effects from the natural atmospheric lighting phenomena 360. A representation of a scene 300 may have tens of thousands to hundreds of thousands or more polygons (e.g., triangles 430), and millions of pixels to process to render the desired image 215. This results in high number of executions of the techniques of the present invention to render a single instance of a scene 300. The present invention also re-executes the above techniques for each frame of a scene 300 in a multiple-frame simulation, such that the high numbers of executions are repeated for each frame.

In another aspect, the techniques of the present invention are applied when any element of the scene 330 is changed or is desired to be changed, or any factors driving the scene 300 are changed or are desired to be changed. For example, any of the following may cause the present invention to apply these techniques and render the image 215 using these techniques:
1) a change to the viewer 350, viewing position 352, view 355 and/or line of sight 354 associated with the scene 300, for example, from panning and/or zooming operations;
2) a change to any terrain 105 and/or atmosphere data used to generate the image 215;
3) a change in position, location, or orientation of any object in the scene 300, or any portion or element of the scene 300, and/or the movement of any object in the scene 300, such as simulating the movement of a man-made object through the scene 300;
4) a change in any characteristic, attribute or property of any object in the scene 300, or any portion or element of the scene 300, for example, change in brightness of the sun and/or density of atmospheric particles 330;
5) addition and/or deletion of any object, or portion or element of the scene 300; for example, adding/deleting types of atmospheric particles 330, clouds 325, sun 320, land mass 307, bodies of water 309, man-made structures and objects 345; and/or
6) a change in any specified constants or parameters, such as user specified constants/parameters used in some embodiments of the techniques of the present invention, for example, constants for the Rayleigh component, $r_{rayleigh}$, and the Mie components, $r_{mie}$;

The techniques of the present invention may be executed for all the polygons and pixels of the image 215 to realistically simulate the natural atmospheric lighting phenomena 360. As such, the techniques of the present invention executed through the graphics processing pipeline 500 determine a color 450 for each vertex 440 of a polygon primitive 430 and any associated pixels/fragments. The determined colors provided by the present invention represent the resulting visual effects from the natural atmospheric lighting and related phenomena 360 that may be present in the scene 300 represented by the image 215. Although the techniques of the present invention use approximations for such phenomena, the techniques provide images that are substantially similar to, comparable or equivalent to photographic representations of such phenomena using physically accurate models and calculations, and as such can be referred to as realistic approximations. That is, the colors rendered in an images 215 provided by the present invention are substantially similar to, comparable or equivalent to the colors that would be present in an actual photograph of such phenomena.

Using the systems and methods of the techniques of the present inventions, images 215 and simulations can provide visually realistic representations of sunlight in a scene 300 at any time of day, including from dawn to twilight. The present invention provides a solar lighting system that produces accurate shadows in the scene 300 along with bright sun flares and dramatically realistic sunsets and sunrises. With the cloud related techniques described above, the present invention can simulate a visually realistic representation of a wide range of cumulus and stratus cloud formations and the resulting cloud cover over a terrain 305. Additionally, the present invention provides a visually realistic representation of shadows cast by clouds 325 on the objects, e.g., 345, and terrain 205 of the scene 300. Furthermore, the present invention provides a realistic simulation of the visual effects from light scattering by the cloud cover, and also provides visually realistic simulation of water including accurate reflections, refractions, and turbulence.

Moreover, the techniques of the present invention not only provide visually realistic images 215 as described above but the present invention can render these images 215 in real-time. Even with a complex geometric representation of an image 215 comprising tens of thousands or more polygons, the techniques of the present invention can be computed and executed with real-time and higher frames rates per second. The simulation engine 220 can process and execute the techniques of the present invention at a rate to support the real-time rendering of frames of a simulated image 215 via the rendering mechanism 210.

In one example embodiment, the present invention can execute these techniques at a real-time rate of approximately 120 frames per second with an image 215 represented by approximately 80,000 polygons. In this example, the computing device 102 comprises a Pentium® 3.4 Ghz processor 104 with 1 gigabyte of ram, and the graphics card/processor 105 is an ATI Technology Radeon® X700 graphics card. The images 215 can be rendered at a 1024×768 resolution with 32-bit color to the visual display device 114. As such, the present invention provides very high frame rates per second, even on typically available or common computing devices 102 that far exceed minimum required speeds for real-time simulation.

In another aspect, the techniques of the present invention provide real-time visually realistic simulation of natural atmospheric lighting phenomena on a wide variety of screen resolutions of the visual display device 114 in combination with a variety of real-time frame rates. The techniques of the present invention can provide real-time images and simulation on visual display devices 114 with any of the following pixel screen resolutions: 160×160, 240×160, 320×240, 640×480, 800×600, 1152×864, 1280×720, 1280×768, 1280×960, 1280×1024, 1024×768, 1600×1280 and 2048×1536. In one embodiment, the techniques of the present invention can be executed at a rate of at least 10 frames per second with images 215 rendered at any of the above pixel screen resolutions. In another embodiment, the techniques of the present invention can be executed at a rate of at least 15 frames per second with images 215 rendered at any of the above pixel screen resolutions. In a further embodiment, the techniques of the present invention can be executed at a rate of at least 20 frames per second with images 215 rendered at any of the above pixel screen resolutions. In one embodiment, the techniques of the present invention can be executed at a rate of at least 24 frames per second with images 215 rendered at any of the above pixel screen resolutions. In another embodiment, the techniques of the present invention can be executed at a rate of at least 30 frames per second with images 215 rendered at any of the above pixel screen resolutions. In another embodiment, the techniques of the present invention can be executed at a rate of at least 35 frames per second with images 215 rendered at any of the above pixel screen resolutions. In some embodiments, the techniques of the present invention can be executed at a rate of at least 40, 50 or 60 frames per second with images 215 rendered at any of the above pixel screen resolutions. One ordinarily skilled in the art will appreciate and recognize that the techniques of the present invention can be executed at any pixel screen resolution supported by the video display device and at any frame rate for real-time rendering.

With the combination of the visual realism and real-time rendering speeds of the present invention, the simulation environment 120 can provide real-world outside scenes 300 for many applications, such as for games and entertainment related applications, and for training such as driving, flight, or military training tools. Simulations provided by the present invention will make the image synthesis process more intuitive for users and will immerse the user into a visually realistic real-world environment and scenario. This will greatly improve the user's experience with the application and make a more effective visual tool for simulation. Furthermore, because of the real-time rendering capability of the simulation environment 120, the techniques of the present invention can be applied interactively and instantly to develop and design real-world scenes for such applications.

In a further aspect, the present invention provides a simulation environment 120 for generating visually realistic scenes 300 interactively. The simulation environment 120 of the present invention provides user interfaces, such as the illustrative graphical user interfaces depicted in FIGS. 20, 21 and 22, for modifying the atmospheric, cloud, sunlight, and water conditions of a scene 300 interactively using a slider system to provide parameters mapping to the techniques of the present invention. As such, scenarios for training, simulation, visual planning or for any other purpose can be easily created dynamically and the results of the interactive modifications rendered in real-time in the simulation environment 120.

Figure 21:
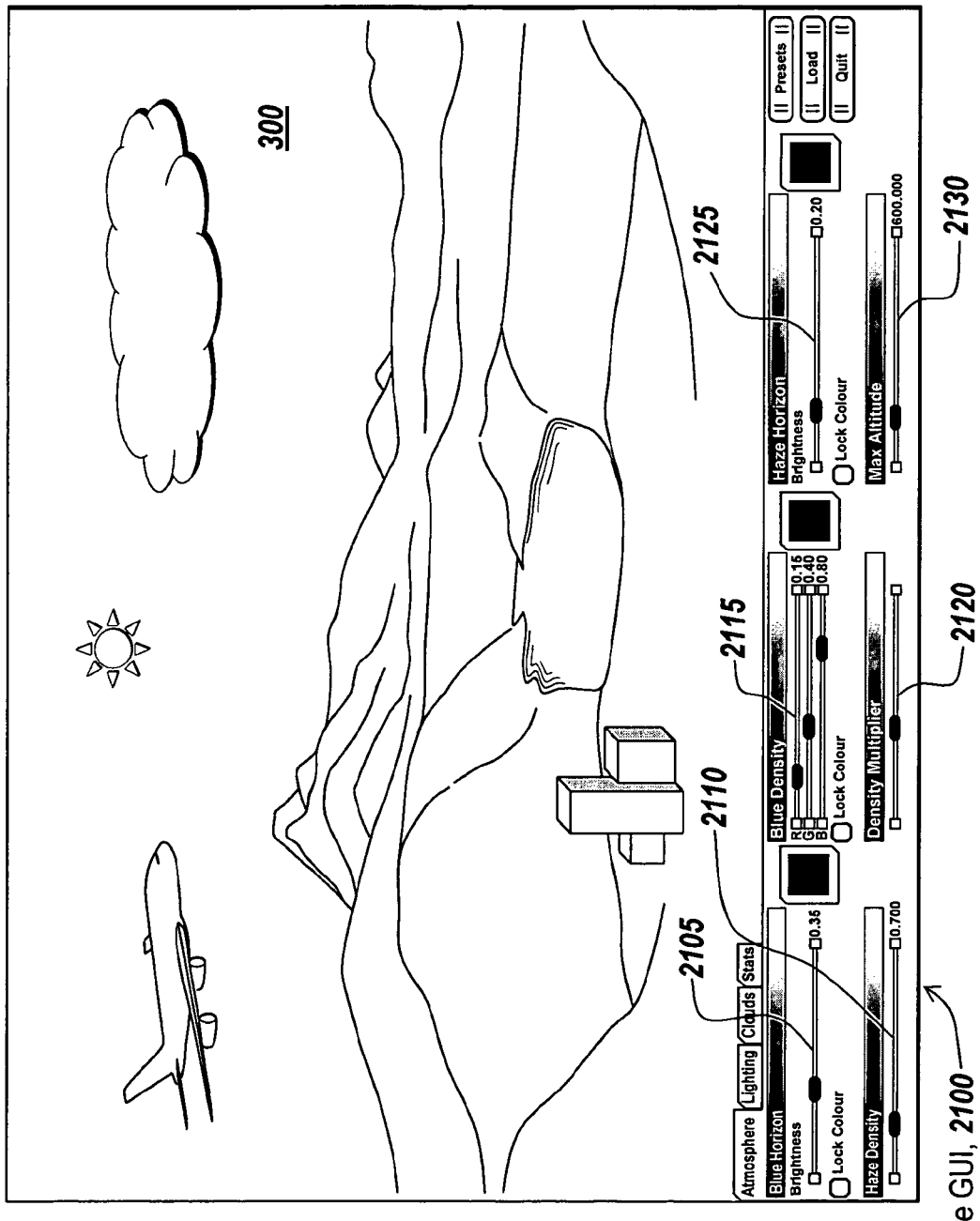
FIG. 21 is a diagrammatic view depicting an illustrative graphical user interface of the simulation environment of the present invention for adjusting atmosphere related parameters.

FIG. 21 depicts an illustrative atmosphere related graphical user interface 2100 ("atmosphere GUI") for interactively changing the visual realism of a scene 300 by changing parameters or associated factors that effect the natural atmospheric lighting and related phenomena 360 related to the atmosphere 310 of the scene 300. In brief overview, the atmosphere GUI 2100 comprises a scene 300 of an image 215 and has the following slider controls to change visual effects of the scene 300: 1) blue horizon brightness slider 2105, 2) blue density slider 2115, 3) haze density slider 2110, 4) density multiplier 2120, 5) a haze horizon slider 2125, and 6) a max altitude slider 2130. Each of these controls allow the user to set a value representing a color and/or a number, such as a real number, used in the realistic approximations of the present invention. In an exemplary embodiment, the color value comprises three real numbers representing red, green and blue components of an RBG color coding scheme. However, in other embodiments, a color value may be generalized to be any set of wavelengths within a color spectral domain or any other color coding scheme.

In the illustrative atmosphere GUI 2100, the blue horizon brightness slider 2105 is used to set or adjust a color value mapping to the $C_{rayleigh}$ parameter used in illustrative method 900 of FIG. 9. The haze horizon slider 2115 is used for setting and adjusting the color value for the $C_{mie}$ parameter used in the approximation equations illustrated by method 1000 of FIG. 10. The blue density slider 2115 provides a selectable blue density color value, and the haze density slider 2110, the density multiplier slider 2120 and the max altitude slider 2130 provide selectable haze density, density multiplier and max altitude real number values to be used in a density distribution function at a particular point s in the scene 300. The blue density color value maps to a multiplier such that $r_{rayleigh}(s)$ at point s is the product of the blue density color and the density distribution function at point s (see illustrated method 600 of FIG. 6). The haze density value maps to a multiple such that $r_{mie}(s)$ at point s is the product of the blue density color and the density distribution function at point s. In an exemplary embodiment, the density distribution function is the value of the density multiplier for points in the atmosphere 310 at or below the max altitude value and is 0 for points above the max altitude value.

Figure 22:
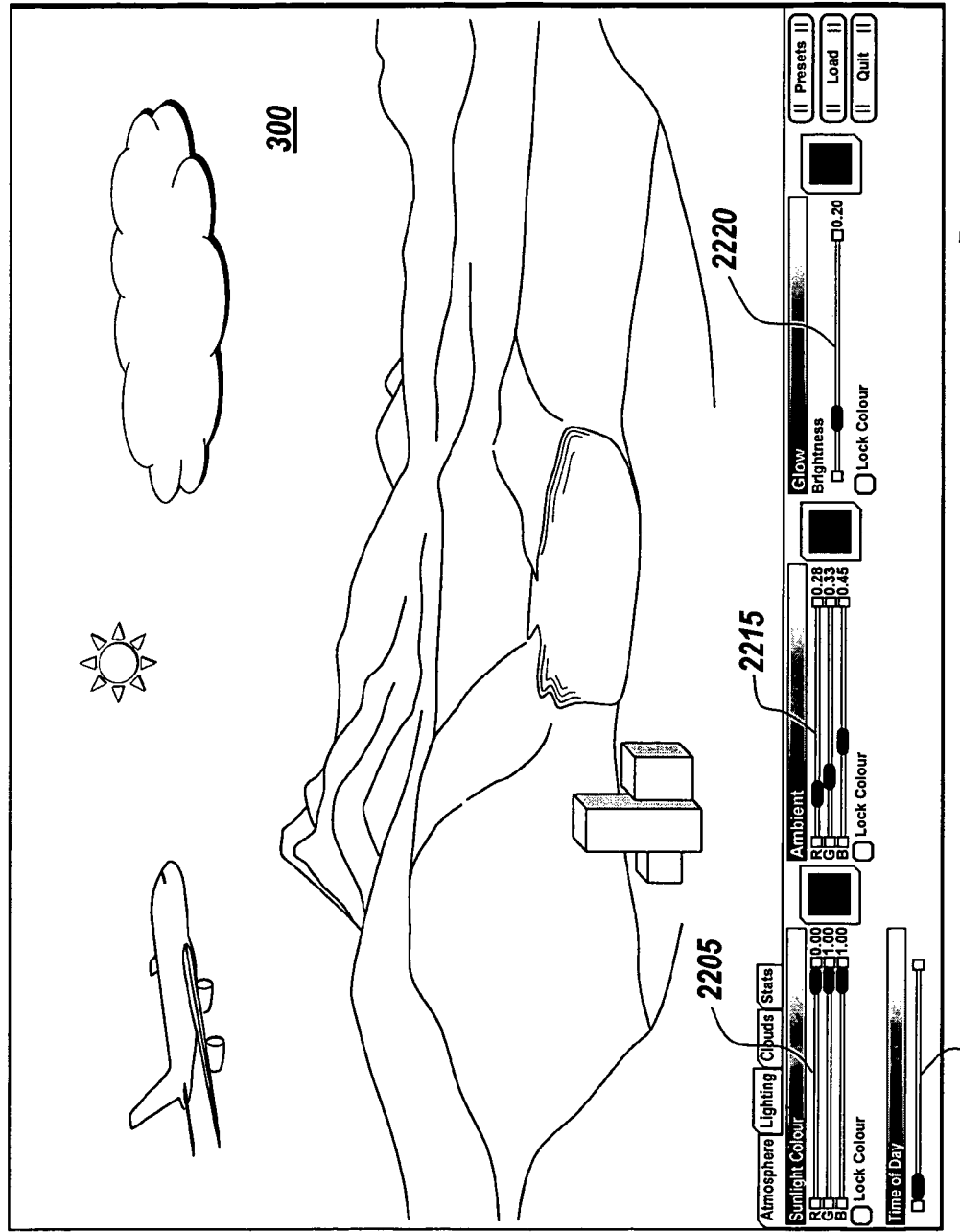
FIG. 22 is a diagrammatic view depicting an illustrative graphical user interface of the simulation environment of the present invention for adjusting lighting related parameters.

FIG. 22 depicts an illustrative lighting related graphical user interface 2200 ("lighting GUI") for interactively changing the visual realism of a scene 300 by changing parameters or associated factors that effect the natural atmospheric lighting and related phenomena 360 related to the lighting of the scene 300. In brief overview, the lighting GUI 2200 comprises a scene 300 of an image 215 and has the following slider controls to change visual effects of the scene 300: 1) sunlight color slider 2205, 2) ambient slider 2210, 3) glow brightness slider 2220, 4) a time of day slider 2215.

In the illustrative lighting GUI 2100, the sunlight color slider 2205 sets or adjusts a color value mapped to the $L_{sun0}$ parameter used in the illustrative method 1900 at step 1945. In a similar manner, the ambient color slider 2215 sets or adjusts a color value mapped to the $L_{ambient}$ parameter used in various techniques of the present invention, such as illustrative methods 900, 1000 and 1600. The glow brightness slider 2220 sets or adjusts three real values mapped to form the parameters k, y, and $\epsilon$ as used for the convergence color approximation of illustrative method 1000. For example purposes, the glow values provided by the glow brightness slider 2220 will be referred to as Glow[0], Glow[1], and Glow[2]. In an exemplary embodiment, the glow values forms the k, y, and $\epsilon$ parameters in the following manner:

k=Glow[0]$^{-\gamma}$ (Glow[0] is not mapped directly to k because it is raised to the power of Glow[2] after assignment.)

$-\gamma$=Glow[2] (Glow[2] should be negative. In an exemplary embodiment, a negative value is used directly in the power function for efficiency, rather than performing a negation in the code.)

$\epsilon$=Glow[1] (in some embodiments, about 0.001)

In another embodiment, the glow values may be used to form the k, y, and $\epsilon$ as follows:

k=Glow[0]

$\gamma$=Glow[2]

$\epsilon$=Glow[1]

In some embodiments, the glow brightness slider 2220 also sets the value of backscattering constant c of step 1025 of illustrative method 1000 to a typical value of 0.25. In other embodiments, the lighting GUI 2200 could provide a slider control or other graphical user interface element to set or adjust the c parameter.

The time of day slider control 2210 controls and provide as value for the sun angle. In an exemplary embodiment, the sun angle is the declination of the sun above the eastern horizon and provides a normalized vector for the sun direction. In some cases, the sun angle can be greater than $\pi/2$ to give a westerly vector for the sun direction. The sun angle value provided by the time of day slider control 220 is used for providing a sun direction parameter for computing the $\theta_{sunlight}$ parameter value as described and used in illustrative methods 1900 and 2000. An x, y and z component of a sun direction parameter can be expressed in relation to the Sun angle, in an exemplary embodiment, as follows:

sunDirection.x=cos($\theta_{east}$)*cos(SunAngle)

sunDirection.y=sin(SunAngle)

sunDirection.z=sin($\theta_{east}$)*cos(SunAngle)

where $\theta_{east}$ is an angle that defines the direction at which the sun rises.

The sun direction parameter as expressed above is used to compute the cos $\phi$ term used in the approximation equations of the present invention, such as used by illustrative method 1000 as step 1035.

Figure 23:
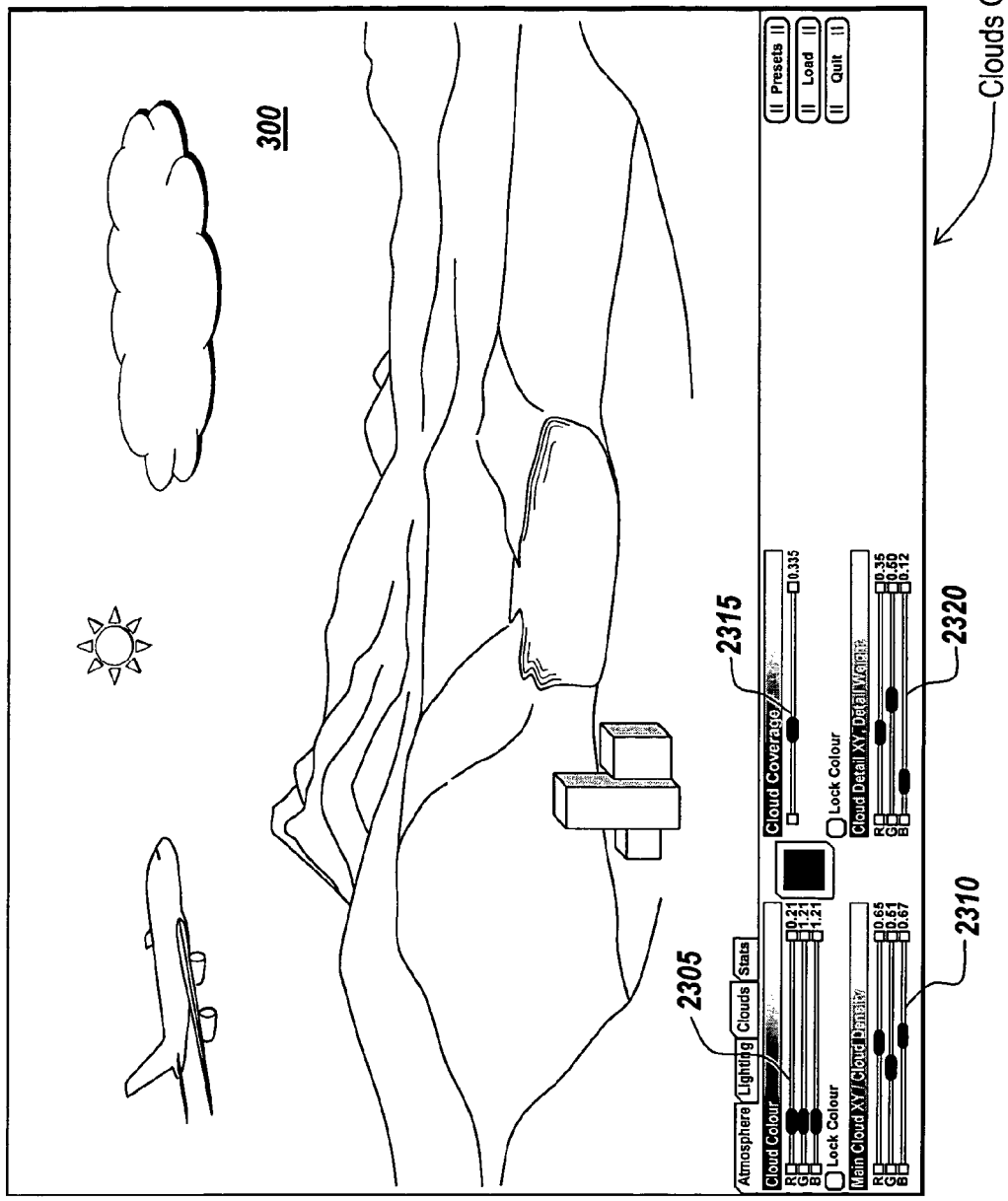
FIG. 23 is a diagrammatic view depicting an illustrative graphical user interface of the simulation environment of the present invention for adjusting cloud related parameters.

FIG. 23 depicts an illustrative cloud related graphical user interface 2300 ("cloud GUI") for interactively changing the visual realism of a scene 300 by changing parameters or associated factors that effect the natural atmospheric lighting and related phenomena 360 related to the clouds 325 of the scene 300. In brief overview, the cloud GUI 2300 comprises a scene 300 of an image 215 and has the following slider controls to change visual effects of the scene 300: 1) cloud color slider 2305, 2) cloud density slider 2310, 3) cloud coverage slider 2215, and 4) a cloud detail slider 2320.

In the illustrative atmosphere GUI 2300, the cloud color slider 2305 is used to set or adjust a color value mapping to the $C_{cloud}$ parameter used in the techniques of the present invention, such as illustrated by method 1600. The cloud coverage slider 2305 sets or adjusts a value between 0 and 1 that maps to $C_{user}$ and is used to control the could density offset as determined in illustrative method 1300. The value from the cloud coverage slider 2305 is also used to factor the proportion of sunlight that is allowed to illuminate the atmosphere below the could layer as illustrated by method 1200 of FIG. 12.

The cloud density 2310 and cloud detail 2320 sliders provide values to be used for the texture offsets and texture weightings in the cloud density function 1205 of FIG. 12. For example purposes, the value of the cloud density slider 2310 is expressed as CloudPosDensity1 and the cloud detail slider 2320 value as CloudPosDensity2. In an exemplary embodiment, the values of CloudPosDensity1 and CloudPosDensity2 are used in conjunction with the cloud density function 1205 as follows:

The x and y components are texture offsets, such that $$(x_1, y_1) = (q_1 x, r_1 y) + (\text{CloudPosDensity1}.x, \text{CloudPosDensity1}.y)$$

$$(x_2, y_2) = (q_2 x, r_2 y) + (\text{CloudPosDensity2}.x, \text{CloudPosDensity2}.y)$$

where ($q_1$ x, $r_1$ y) and ($q_2$ x, $r_2$ y) are the scaled texture coordinates for textures 1 and 2 at the point being rendered (x, y).

The z components map to weightings for textures 1 and 2, such that:

$$w_1 = \text{CloudPosDensity1}.z$$

$$w_2 = \text{CloudPosDensity2}.z$$

In one embodiment (not shown), a slider may also be provided in the cloud GUI 2300 or any other GUI 2100, 2200 to allow the user to adjust the apparent vertical position of the atmosphere's horizon and gradient as well as the glow around the sun. This is determined by offsetting the vertical component of the ray towards the object being considered:

$$(\gamma_{apparent} - \gamma_{viewer}) = (\gamma_{actual} - \gamma_{viewer}) + |p - p_{viewer}| \cdot \text{HorizonDrop}$$

where HorizonDrop is the value provided by the slider, $|p - p_{viewer}|$ is the length of the ray, $(\gamma_{actual} - \gamma_{viewer})$ is the vertical component of the ray, and $(\gamma_{apparent} - \gamma_{viewer})$ is the vertical component of the apparent ray which is used by all subsequent atmosphere calculations, such as those performed in illustrative method 1000.

Although slider controls are used in the illustrative graphical user interface 2100, 2200 and 2300, any type of suitable user interface mechanism may be used, such as other types of graphical user interface widgets, configuration files, or data from a database. Additionally, the graphical user interfaces 2100, 2200 and 2300 could be combined into a single user interface, or separated further into more graphical user interfaces. Furthermore, other elements to the graphical user interfaces 2100, 2200 and 2300, and/or additional graphical user interfaces could be provided to allow the user to adjust any constant, parameter or other factor related to the techniques of the present invention described above to generate or create the desired scene 300 and image 215.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for providing a realistic simulation of natural atmospheric lighting phenomenon, the method comprising the steps of:
   providing by a simulation engine in a simulation environment an image realistically representing a scene of natural atmospheric lighting phenomenon having an atmosphere, atmospheric particles, and light;
   providing by the simulation engine a viewing position and one or more viewing objects associated with a view of the scene, the one or more viewing objects comprising an element of the image;
   determining by a shader, in real-time, a color of one or more portions of the image to realistically represent one or more visual effects from the natural atmospheric lighting phenomenon of the scene from:
      an opacity of atmospheric particles to pass light onto other atmospheric particles determined from a cumulative density comprising an integral of densities of atmospheric particles along a ray from the viewing position to the one or more viewing objects,
      a change in light, and
      one or more of the following: the view, the viewing position, one or more viewing objects, atmosphere and atmospheric particles;
   determining, by the shader in real-time, a color of one or more portions of the image to realistically represent one or more visual effects from the natural atmospheric lighting phenomenon of the scene acting on one or more clouds within the atmosphere based on: a color of the one or more clouds determined from a product of a user-specified cloud color, an attenuation factor determined from a line integral of the atmospheric density along the ray from the viewing position to the one or more clouds, and a summation of ambient light and a sunlight term for lighting of the one or more clouds that is proportional to a color and intensity of sunlight reaching a top layer of the one or more clouds, a phase function simulating scattering within the one or more clouds, and a self-shadowing factor representative of the sunlight attenuated by atmospheric particles within the one or more clouds; and
   rendering, by a renderer in real-time, images of the scene comprising the color of one or more portions of the image to realistically simulate the one or more visual effects.

2. The method of claim 1, wherein real-time comprises a rate of processing to provide for realistically simulating at a frame per second rate of at least 10 frames per second.

3. The method of claim 1, wherein the atmospheric particles represent a portion of one or more of the following: a cloud, rain, ice, dust, fog, haze, and air.

4. The method of claim 1, wherein at least one of the one or more viewing objects represent one or more of the following: a sky, a cloud, a land mass, a celestial body, a body of water, and a man-made item.

5. The method of claim 1, wherein the light represents a portion of illumination from sunlight, and scattering of light by atmospheric particles.

6. The method of claim 1, wherein the step of rendering comprises depicting a movement of at least one of the viewing objects in the scene.

7. The method of claim 1, wherein determining the color comprises calculating a realistic approximation of a visible effect on the natural atmospheric lighting phenomenon from one or more of the following: in scattering light from atmospheric particles, out scattering light from atmospheric particles, sunlight illumination, ambient illumination, cloud appearance, cloud density, cloud lighting, and cloud shadowing.

8. The method of claim 1, comprising determining the color from an effect of the atmospheric particles scattering out light between the viewing position and at least one of the one or more viewing objects by calculating an attenuation factor that realistically approximates a proportion of light reduced from the light reaching the viewing position from the viewing object.

9. The method of claim 8, wherein the attenuation factor is wavelength dependent and derived from a calculation of a cumulative density of atmospheric particles along a path of the line of sight between the viewing position and the least one viewing object, wherein the cumulative density is determined from a line integral of the atmospheric density along the ray from the viewing position to the at least one viewing object.

10. The method of claim 1, comprising determining the color from an effect of the atmospheric particles scattering light into the line of sight between the viewing position and at least one of the one or more viewings object by calculating an additive factor as a function of an attenuation factor and a convergence color that realistically approximates an increase to the light reaching the viewing position from the viewing object.

11. The method of claim 10, wherein the convergence color is dependent on a selected horizon color and is derived from a calculation of a cumulative density of atmospheric particles along a path of the light of sight between the viewing position and at least one viewing object, wherein the cumulative density is proportional to the length of the intersection of a path of the line of sight with the atmosphere.

12. The method of claim 1, comprising determining the color from an effect of sunlight illuminating at a point in the atmosphere as viewed from the viewing point by calculating a sunlight attenuation factor that realistically approximates a proportion of sunlight reaching the point in the atmosphere.

13. The method of claim 12, wherein the sunlight attenuation factor is derived from a calculation of a cumulative optical density along a path from the viewing point towards a zenith divided by a positive summation of a value proportional to an altitude of the sun and a value proportional to a view angle above the horizon.

14. The method of claim 1, wherein the step of determining a color of one or more portions of the image further comprises determining, in real time, an opacity of the atmospheric particles to pass light onto one or more of the following: the one or more viewing objects, the atmosphere, and the atmospheric particles, based on the cumulative density of the atmospheric particles.

15. The method of claim 14, further comprising determining, in real time, a color of one or more of the atmosphere, the one or more viewing objects and the atmospheric particles in the image based on the determined opacity and a convergence color dependent on a selected horizon color.

16. The method of claim 14, further comprising determining the opacity as a value determined from a base of a natural logarithm (e) raised to a power of a negative of a line integral of the density of the atmospheric particles.

17. The method of claim 14, further comprising determining the opacity as a value determined from a ratio of the density of the atmospheric particles to a user defined offset.

18. The method of claim 1, wherein the step of determining the color of one or more portions of the image further comprises determining a first convergence color for Rayleigh scattering and a second convergence color for Mie scattering, and determining the color based on a weighted average of a combination of the first convergence color and the second convergence color.

19. The method of claim 1, further comprising determining, by a shader in real-time, a color of one or more portions of the image to realistically represent one or more visual effects from the natural atmospheric lighting phenomenon of the scene acting on one or more clouds within the atmosphere based on a cloud density comprising a positive summation of weighted cloud texture values and an offset.

20. The method of claim 19, wherein the offset is a combination of a user specified offset and a value proportional to a summation of the weightings of the cloud texture values.

21. The method of claim 1, further comprising determining by the shader in real-time, the color of the one or more portions of the image by a summation of the color of the one or more clouds, a cumulative attenuation factor that realistically approximates a proportion of light reduced from the light reaching the viewing position from the cloud, and an additive factor that is a function of the cumulative attenuation factor and a convergence color that realistically approximates an increase in the light reaching the viewing position from the cloud.

22. A system for providing a realistic simulation of natural atmospheric lighting phenomenon, the system comprising:
 a simulation environment providing an image realistically representing a scene of a natural atmospheric lighting phenomenon comprising an atmosphere, atmospheric particles, and light, and providing a viewing position and one or more viewing objects associated with a view of the image, the one or more viewing objects comprising an element of the image;
 a simulation engine determining, in real-time, a color of one or more portions of the image to realistically represent one or more visual effects from the natural atmospheric lighting phenomenon of the scene from:
  an opacity of atmospheric particles to pass light onto other atmospheric particles determined from a cumulative density comprising an integral of densities of atmospheric particles along a ray from the viewing position to the one or more viewing objects,
  a change in light, and
  one or more of the following: the view, the viewing position, one or more viewing objects, atmosphere and atmospheric particles; and
 determining a color of one or more portions of the image to realistically represent one or more visual effects from the natural atmospheric lighting phenomenon of the scene acting on one or more clouds within the atmosphere based on: a color of the one or more clouds determined from a product of a user-specified cloud color, an attenuation factor determined from a line integral of the atmospheric density along the ray from the viewing position to the one or more clouds, and a summation of ambient light and a sunlight term for lighting of the one or more clouds that is proportional to a color and intensity of sunlight reaching a top layer of the one or more clouds, a phase function simulating scattering within the one or more clouds, and a self-shadowing factor representative of the sunlight attenuated by atmospheric particles within the one or more clouds; and a rendering mechanism rendering, in real-time, images of the scene comprising the color of one or more portions of the image to realistically simulate the one or more visible effects.

23. The system of claim 22, wherein the simulation engines determines the color a processing rate to provide an image for the rendering mechanism to render at a frame per second rate of at least 10 frames per second.

24. The system of claim 22, wherein the atmospheric particles represent a portion of one or more of the following: a cloud, rain, ice, dust, fog, haze, and air.

25. The system of claim 22, wherein at least one of the one or more viewing objects represent one or more of the following: a sky, a cloud, a land mass, a celestial body, a body of water, and a man-made physical item.

26. The system of claim 22, wherein the light represents a portion of illumination from sunlight and scattering of light by atmospheric particles.

27. The system of claim 22, wherein the simulation provided by the simulation environment depicts a movement of at least one of the viewing objects in the scene.

28. The system of claim 22, wherein the simulation engine determines the color by calculating a realistic approximation of a visible effect on the natural atmospheric lighting phenomenon from one or more of the following: in scattering light from atmospheric particles, out scattering light from atmospheric particles, sunlight illumination, ambient illumination, cloud appearance, cloud density, cloud lighting, and cloud shadowing.

29. The system of claim 22, wherein the simulation engine determines the color from an effect of the atmospheric particles scattering out light between the viewing position and at least one of the one or more viewing objects by calculating an attenuation factor that realistically approximates a proportion of light reduced from the light reaching the viewing position from the viewing object.

30. The system of claim 29, wherein the attenuation factor is wavelength dependent and derived from a calculation of a cumulative density of atmospheric particles along a path of the line of sight between the viewing position and the least one viewing object, wherein the cumulative density is determined from a line integral of the atmospheric density along the ray from the viewing position to the at least one viewing object.

31. The system of claim 22, wherein the simulation engine determines the color from an effect of the atmospheric particles scattering light into the line of sight between the viewing position and at least one of the one or more viewings object by calculating an additive factor as a function of the attenuation factor and a convergence color that realistically approximates an increase to the light reaching the viewing position from the viewing object.

32. The system of claim 31, wherein the convergence color is dependent on a selected horizon color and is derived from a calculation of a cumulative density of atmospheric particles along a path of the light of sight between the viewing position and at least one viewing object, wherein the cumulative density is proportional to the length of the intersection of a path of the line of sight with the atmosphere.

33. The system of claim 22, wherein the simulation engine determines the color from an effect of sunlight illuminating at a point in the atmosphere as viewed from the viewing point by calculating a sunlight attenuation factor that realistically approximates a proportion of sunlight reaching the point in the atmosphere.

34. The system of claim 33, wherein the sunlight attenuation factor is derived from a calculation of a cumulative optical density along a path from the viewing point towards a zenith divided by a positive summation of a value proportional to an altitude of the sun and a value proportional to a view angle above the horizon.

* * * * *